United States Patent
King et al.

(10) Patent No.: US 12,465,898 B2
(45) Date of Patent: Nov. 11, 2025

(54) EMULSIFICATION SYSTEM

(71) Applicant: COZZINI LLC, Elk Grove Village, IL (US)

(72) Inventors: Edwin Earl King, Lombard, IL (US); Michael E. Burns, Elk Grove Village, IL (US)

(73) Assignee: COZZINI LLC, Elk Grove Village, IL (US)

( * ) Notice: Subject to any disclaimer, the term of this patent is extended or adjusted under 35 U.S.C. 154(b) by 698 days.

(21) Appl. No.: 17/851,142

(22) Filed: Jun. 28, 2022

(65) Prior Publication Data

US 2023/0311079 A1 Oct. 5, 2023

Related U.S. Application Data

(60) Provisional application No. 63/342,848, filed on May 17, 2022, provisional application No. 63/325,764, filed on Mar. 31, 2022.

(51) Int. Cl.
| | |
|---|---|
| *B01F 27/1151* | (2022.01) |
| *B01F 23/41* | (2022.01) |
| *B01F 27/172* | (2022.01) |
| *B02C 18/36* | (2006.01) |
| *A22C 5/00* | (2006.01) |
| *B01F 101/06* | (2022.01) |

(52) U.S. Cl.
CPC .......... *B01F 27/1151* (2022.01); *B01F 23/41* (2022.01); *B01F 27/172* (2022.01); *B02C 18/362* (2013.01); *A22C 5/00* (2013.01); *B01F 2101/06* (2022.01); *B01F 2215/0431* (2013.01)

(58) Field of Classification Search
CPC .... B01F 27/172; B01F 27/1151; B01F 23/41; B01F 2215/0431
See application file for complete search history.

(56) References Cited

U.S. PATENT DOCUMENTS

| | | |
|---|---|---|
| 1,695,898 A | 12/1928 | Laemmel |
| 1,727,753 A | 9/1929 | De Bethune |
| 2,625,846 A | 1/1953 | Hess |
| 2,851,256 A | 9/1958 | Andreopoulos et al. |
| 3,286,551 A | 11/1966 | Tipton |
| 3,471,800 A | 10/1969 | Congleton et al. |

(Continued)

FOREIGN PATENT DOCUMENTS

| | | |
|---|---|---|
| CH | 142 426 A | 9/1930 |
| CH | 367729 | 2/1963 |

(Continued)

OTHER PUBLICATIONS

Extended European Search Report issued in Appl. No. EP22190029.3 (May 22, 2023).

(Continued)

*Primary Examiner* — Marc C Howell
(74) *Attorney, Agent, or Firm* — Barnes & Thornburg LLP

(57) ABSTRACT

An emulsion system is provided. The system includes a shaft that supports a plurality of cutting assemblies and plates in alternating order, wherein the cutting assembly rotates with respect to an in close proximity to the plate. The plurality of cutting plates each on their circumferential edge have an identification system to memorialize the diameter of the emulsion holes.

25 Claims, 15 Drawing Sheets

(56) References Cited

U.S. PATENT DOCUMENTS

| | | | |
|---|---|---|---|
| 3,542,104 | A | 11/1970 | Anderson |
| 3,936,005 | A | 2/1976 | Schnell |
| 3,976,252 | A | 8/1976 | Perdue |
| 4,023,253 | A | 5/1977 | Funakubo |
| 4,029,149 | A | 6/1977 | Perkins |
| D336,882 | S | 6/1993 | Steinke et al. |
| 6,007,007 | A | 12/1999 | Haack et al. |
| 6,502,980 | B1 | 1/2003 | Ekstrom et al. |
| 7,540,440 | B2 | 6/2009 | Lesar et al. |
| 7,628,345 | B2 | 12/2009 | Handtmann et al. |
| 7,905,436 | B2 | 3/2011 | Lesar et al. |
| D678,725 | S | 3/2013 | Sayers et al. |
| D680,373 | S | 4/2013 | Haggerty et al. |
| 8,690,092 | B2 | 4/2014 | Jenkins |
| D746,344 | S | 12/2015 | Truty |
| D847,882 | S | 5/2019 | King |
| D849,807 | S | 5/2019 | King |
| 10,363,563 | B2 | 7/2019 | Norberg |
| 10,682,650 | B2 | 6/2020 | Joechner |
| D904,473 | S | 12/2020 | King et al. |
| 2001/0052558 | A1 | 12/2001 | Younker |
| 2002/0084368 | A1* | 7/2002 | Bernhardt ............... B02C 23/04 241/82.5 |
| 2004/0108281 | A1 | 6/2004 | Gerteis et al. |
| 2007/0090220 | A1* | 4/2007 | Lesar ................... B02C 18/305 241/82.5 |
| 2009/0026295 | A1 | 1/2009 | Mathiebe |
| 2010/0282887 | A1 | 11/2010 | Walters |
| 2011/0248105 | A1 | 10/2011 | Braig |
| 2012/0261501 | A1 | 10/2012 | Walther |
| 2013/0062445 | A1 | 3/2013 | Wolff |
| 2013/0099036 | A1 | 4/2013 | Wolff |
| 2013/0164425 | A1 | 6/2013 | Wolff |
| 2013/0284835 | A1 | 10/2013 | Quadrana |
| 2014/0252143 | A1 | 9/2014 | Wight |
| 2015/0196039 | A1 | 7/2015 | Wolff |
| 2015/0283777 | A1 | 10/2015 | Dendel et al. |
| 2016/0051990 | A1 | 2/2016 | Joechner |
| 2016/0228880 | A1 | 8/2016 | Norberg |
| 2017/0189913 | A1* | 7/2017 | Metcalf ................... B02C 18/30 |
| 2017/0266717 | A1 | 9/2017 | Cassinath |
| 2020/0298249 | A1 | 9/2020 | King et al. |

FOREIGN PATENT DOCUMENTS

| | | |
|---|---|---|
| CN | 1520338 | 8/2004 |
| CN | 203990806 U | 12/2014 |
| CN | 106070507 | 11/2016 |
| DE | 299 05 708 U1 | 7/1999 |
| DE | 199 08 665 C1 | 1/2001 |
| GB | 1385970 | 3/1975 |
| TH | 179259 | 8/2018 |
| WO | 2018/011726 | 1/2018 |

OTHER PUBLICATIONS

United States Office Action in U.S. Appl. No. 17/852,629, dated Jun. 21, 2024.

Extended European Search Report dated Aug. 7, 2019 for EP19174035.6.

English translation of Office Action issued in Appl. No. CN201910405733.6 (Nov. 18, 2022).

Malaysia Substantive Examination Adverse Report from corresponding MY patent application No. PI2022004811 (May 25, 2025).

Thailand Office Action from corresponding TH patent application No. 0709/2505-008462 (Aug. 15, 2025).

Thailand Office Action from corresponding TH patent application No. 0709/2505-008461 (Aug. 15, 2025).

* cited by examiner

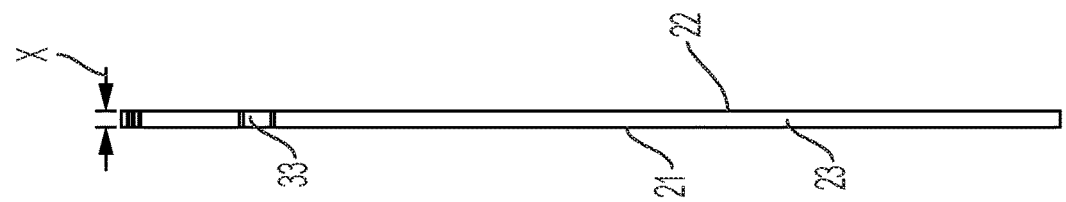
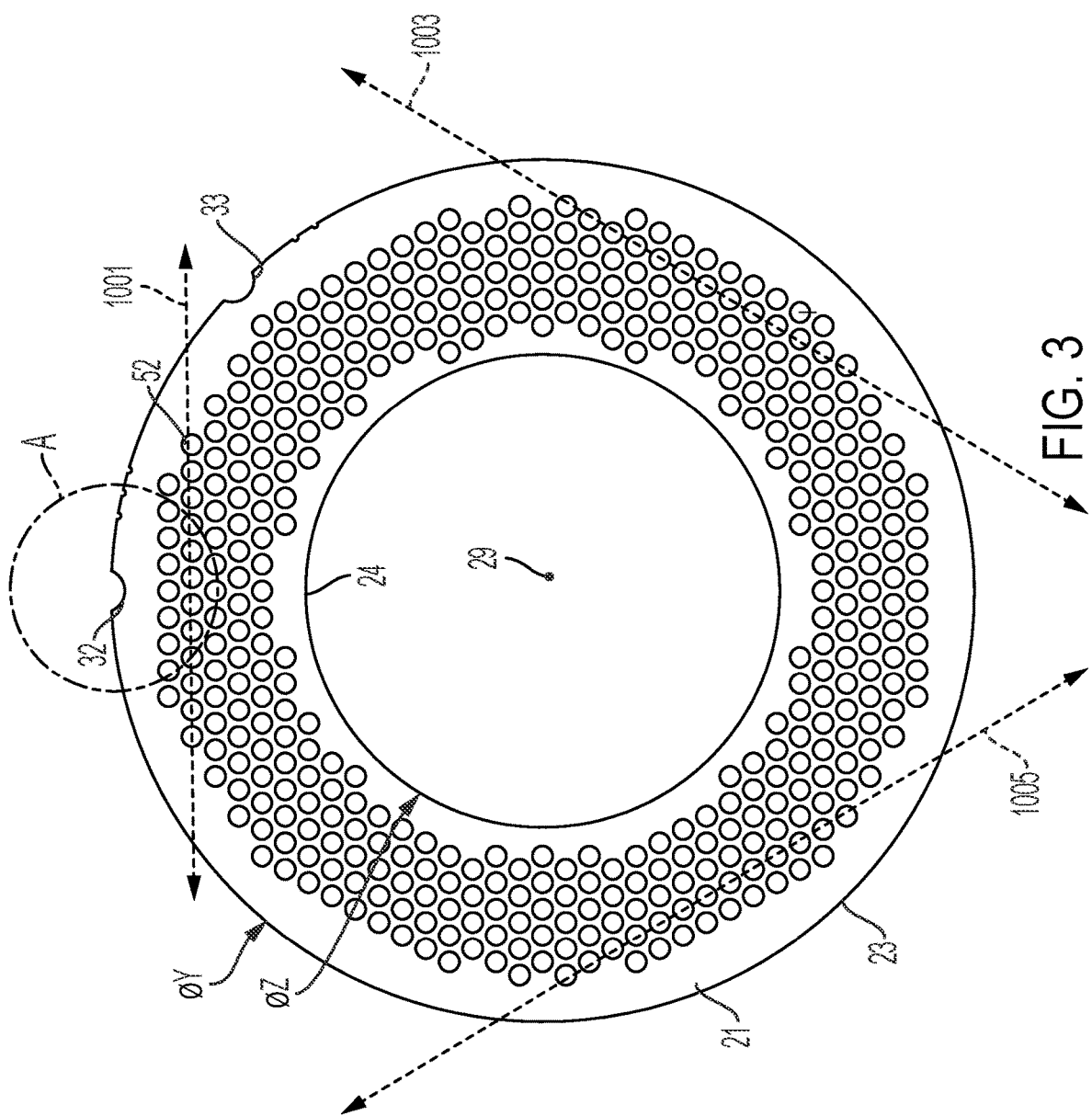

EMULSIFICATION SYSTEM

CROSS-REFERENCE TO RELATED APPLICATIONS

This application claims priority from U.S. Provisional Application No. 63/325,764, filed on Mar. 31, 2022, and from U.S. Provisional Application No. 63/342,848, filed on May 17, 2022, the entirety of each are hereby fully incorporated by reference herein.

TECHNICAL FIELD

The subject application relates to an emulsification system that is provided to emulsify or grind food product into small pieces or a slurry via the pressure applied by a pump, and often with a vacuum back pressure, and in the presence of multiple rotating cutting assemblies that cut the food particles into smaller and smaller sizes as the food product is pulled through the plates. Emulsion systems periodically need to be disassembled for cleaning, and periodically or as needed, components of the emulsion system need to be replaced (e.g. knife cutting elements) or machined (i.e. emulsion plates). The disclosed device is intended to reduce the need for machining certain components within an emulsion system to simplify the supply chain and maintenance practices of users of emulsion systems.

BRIEF SUMMARY

A first representative embodiment of the disclosure is provided. The embodiment includes an emulsion system. The emulsion system includes a housing to fixedly support one or more emulsion plates and rotatably support one or more knives that rotate with respect to respective one or more emulsion plates, wherein each of the one or more emulsion plates comprises: a plate that defines opposite first and second face surfaces and an edge that extends around a circumference of the plate; a center hole extends through the plate, the center hole adapted to receive a shaft therethrough; a plurality of emulsion holes disposed radially outward from the center hole, each of the plurality of emulsion holes configured to allow food to pass therethrough, wherein each of the emulsion holes are formed with a uniform diameter; the edge is a uniform width throughout the circumference of the plate, wherein the edge comprises one or more first indentations that are configured to engage with one or more corresponding projections within the housing to fix the emulsion plate within the housing; the edge further comprises one or both of a first set of second indentations and a second set of second indentations, wherein each of the second indentations are smaller than the one or more first indentations, wherein the first set of indentations are disposed on a first side of a first indentation of the one or more first indentations and the second set of indentations are disposed on an opposite second side of the first indentation of the one or more first indentations, and wherein the amount of indentations within the first set of second indentations corresponds to a first digit of the uniform diameter of the plurality of emulsion holes, and the amount of indentations of the second set of second indentations corresponds to a second digit of the uniform diameter of the plurality of emulsion holes.

A second embodiment of the disclosure is provided. The second embodiment includes an emulsion plate. The emulsion plate includes opposite face surfaces and an edge that extends around a circumference of the plate; a center hole extends through the plate, the center hole adapted to receive a shaft therethrough; a plurality of emulsion holes disposed radially outward from the center holes, each of the plurality of emulsion holes configured to allow food to pass therethrough, wherein each of the emulsion holes are formed with a uniform diameter; the edge is a uniform width throughout the circumference of the plate, wherein the edge comprises one or more first indentations that are configured to engage with one or more corresponding projections within a housing that encloses the plate; the edge further comprises one or both of a first set of second indentations and a second set of second indentations, wherein each of the second indentations are smaller than the one or more first indentations, wherein the first set of indentations are disposed on a first side of a first indentation of the one or more first indentations and the second set of indentations are disposed on an opposite second side of the first indentation of the one or more first indentations, and wherein the amount of indentations within the first set of second indentations corresponds to a first digit of the uniform diameter, and the amount of indentations of the second set of second indentations corresponds to a second digit of the uniform diameter.

Another representative embodiment of the disclosure is provided. The embodiment includes an emulsion plate system. The system includes a first plate with opposite face surfaces and an edge that extends around a circumference of the plate and a center hole that extends through the plate, the center hole adapted to receive a shaft therethrough. A plurality of emulsion holes are disposed radially outward from the center holes, each of the plurality of emulsion holes configured to allow food to pass therethrough, wherein each of the emulsion holes are formed with a uniform diameter, the edge is a uniform width throughout the circumference of the plate, wherein the edge comprises one or more first indentations that are configured to engage with one or more corresponding projections within a housing that encloses the plate. The edge further comprises one or both of a first set of second indentations and a second set of second indentations, wherein each of the second indentations are smaller than the one or more first indentations. T first set of indentations are disposed on a first side of a first indentation of the one or more first indentations and the second set of indentations are disposed on an opposite second side of the first indentation of the one or more first indentations. The amount of indentations within the first set of second indentations corresponds to a first digit of the uniform diameter, and the amount of indentations of the second set of second indentations corresponds to a second digit of the uniform diameter. A second plate with opposite first and second face surfaces and an edge that extends around a circumference of the second plate, a center hole to receive the shaft therethrough, and a plurality of emulsion holes, wherein the plate and the second plate are aligned such that a second face of the plate makes contact with the first face of the second plate, such that the plurality of emulsion holes of the plate are co-axial with the plurality of emulsion holes of the second plate, wherein the plate and the second plate are substantially the same diameter.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 3 is a front view of a first emulsion plate usable in the emulsion device of FIG. 1.

FIG. 3A is a side (edge) view of the first emulsion plate of FIG. 3.

DETAILED DESCRIPTION OF THE DRAWINGS

Figure 1:
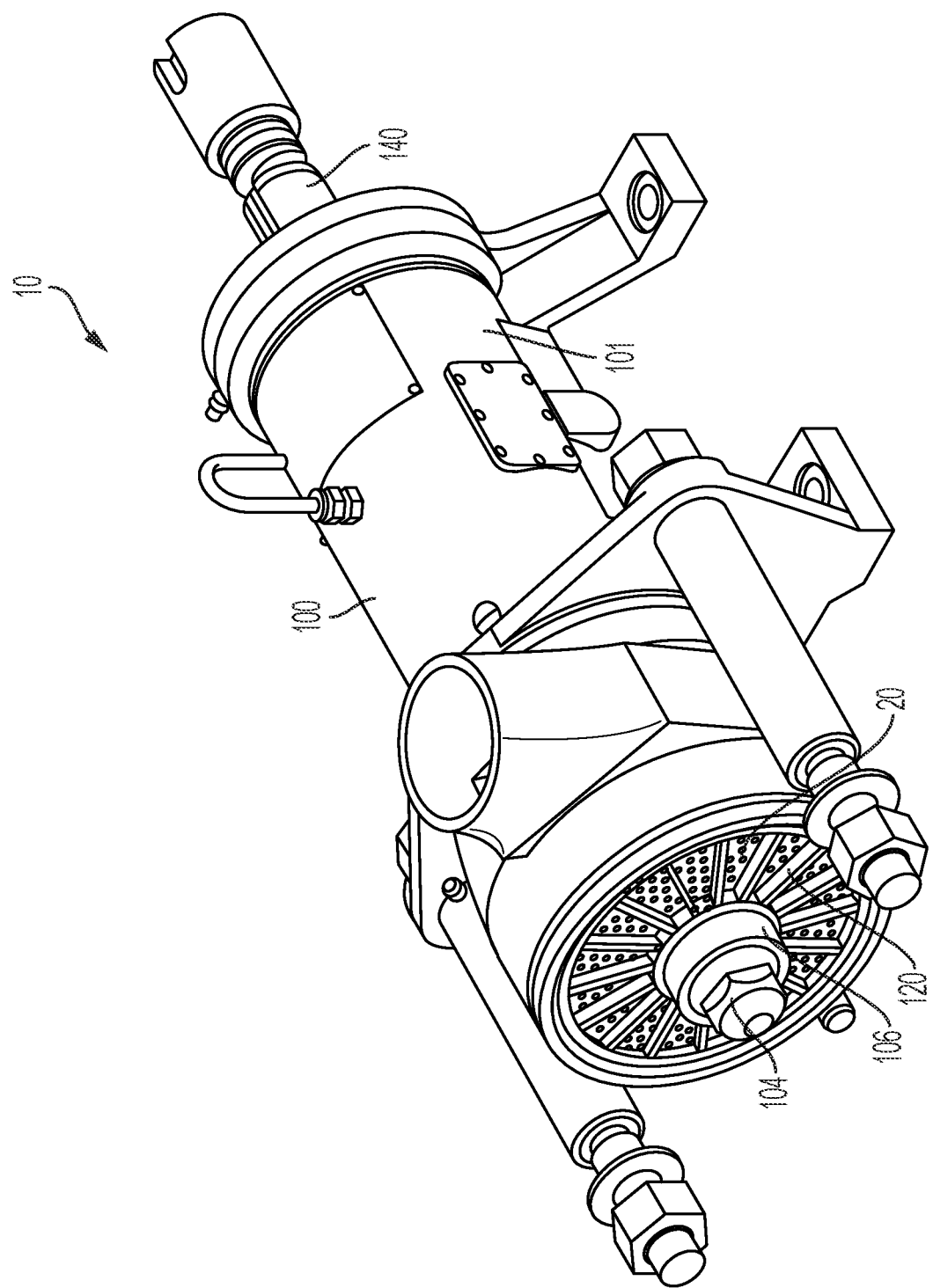
FIG. 1 is a perspective view of an emulsion device.

Turning now to FIGS. 1-6a, an emulsion or grinding device 10 is provided. The emulsion device 10 is configured to accept a flow of relatively large sized food product, such as meat, and to emulsify or grind the food to a much smaller consistency for further processing, packaging, or for customer use in that state. In some embodiments, the device 10 is used to prepare emulsions of food products that are intended for human consumption where generally bones are removed before the grinding or emulsification process, while in other embodiments the device 10 is used to prepare emulsions of food products that are intended for pet food, where a certain percentage or size of final bone material is allowed within a saleable food unit. Emulsions that are prepared by the device may be used in saleable food products such as hot dogs, sausage, pet foods, and the like. Emulsions may also be prepared that are not intended for commercial sale to an end consumer, but are used in animal feed or for other uses. In other embodiments, emulsions may be used for materials that are not intended for use as human or animal food. While the subject specification generally references the use for food products—one of ordinary skill in the art will readily understand with a detailed review and understanding of this specification that the device 10 may be provided for uses other than food products—and the material to be provided to be ground or emulsified by the device 10 would substitute for the use of "food product" as described herein.

Emulsion devices often include a plurality of fixed plates that are placed in an alternating fashion with rotating knives. In emulsion devices with multiple plates, the plates are often are arranged where the first plate has the largest hole sizes, then thereafter plates with decreasing hole size are provided, which each result in smaller portions of food passing through the plate. In some embodiments, a vacuum is created at the discharge of the emulsion system at the discharge of an impeller, which increases a differential pressure across the plurality of plates and knives to urge food through the plurality of holes in each plate, and the rotating of the knifes across the surface (in some embodiments across only the front surface of each plate, and in other embodiments also across the rear surface of each plate) cuts the food that flows through the hole with each passage of the knife across each hole. In other embodiments, a pump may be provided in front of the final plate to push the food product through the sets of plates and knives. In still other embodiments, the machine may be aligned such that the food product is urged through the plates and knives with the force of gravity.

As the knives slide across the front and in some embodiments the rear surface of the plates, the surfaces of the plate may become worn or discontinuous, particularly at the edges of the holes in the plate. Accordingly, the emulsion system must be periodically disassembled for cleaning, and when the system is disassembled, the front of the plates are frequently machined to return the plates to a smooth surface finish and to remove any burs or protruding metal from the plates. Often users of emulsification machines have facilities to machine the emulsion plates in-house, but other users must rely upon vendors or the manufacturer of the emulsion plates to machine the plates to return the plates to a usable condition.

In some embodiments the duration of use of emulsion plates between a need for machining is significantly increased when the surfaces of the plate are lapped to a very smooth finish and coated before use. For example, in some embodiments a very smooth surface finish is provided by the manufacturing process of the plate. For example, plates may be lapped such that their surface finish is no more than a 6 Ra finish. A surface coating may also be provided upon plates to increase their lifetime against wear and to minimize the frequency that a plate would need to be machined to be smooth enough for use. In some embodiments, the surfaces of the plate may be coated with Chromium Nitride to aid in the wear performance of the plate. In some embodiments, the Chromium Nitride coating may be at a thickness of between about 2 microns and about 5 microns. In some embodiments, the plate is polished after coated with Chromium Nitride so that it has a surface finish of no more than 6 Ra.

Figure 2:
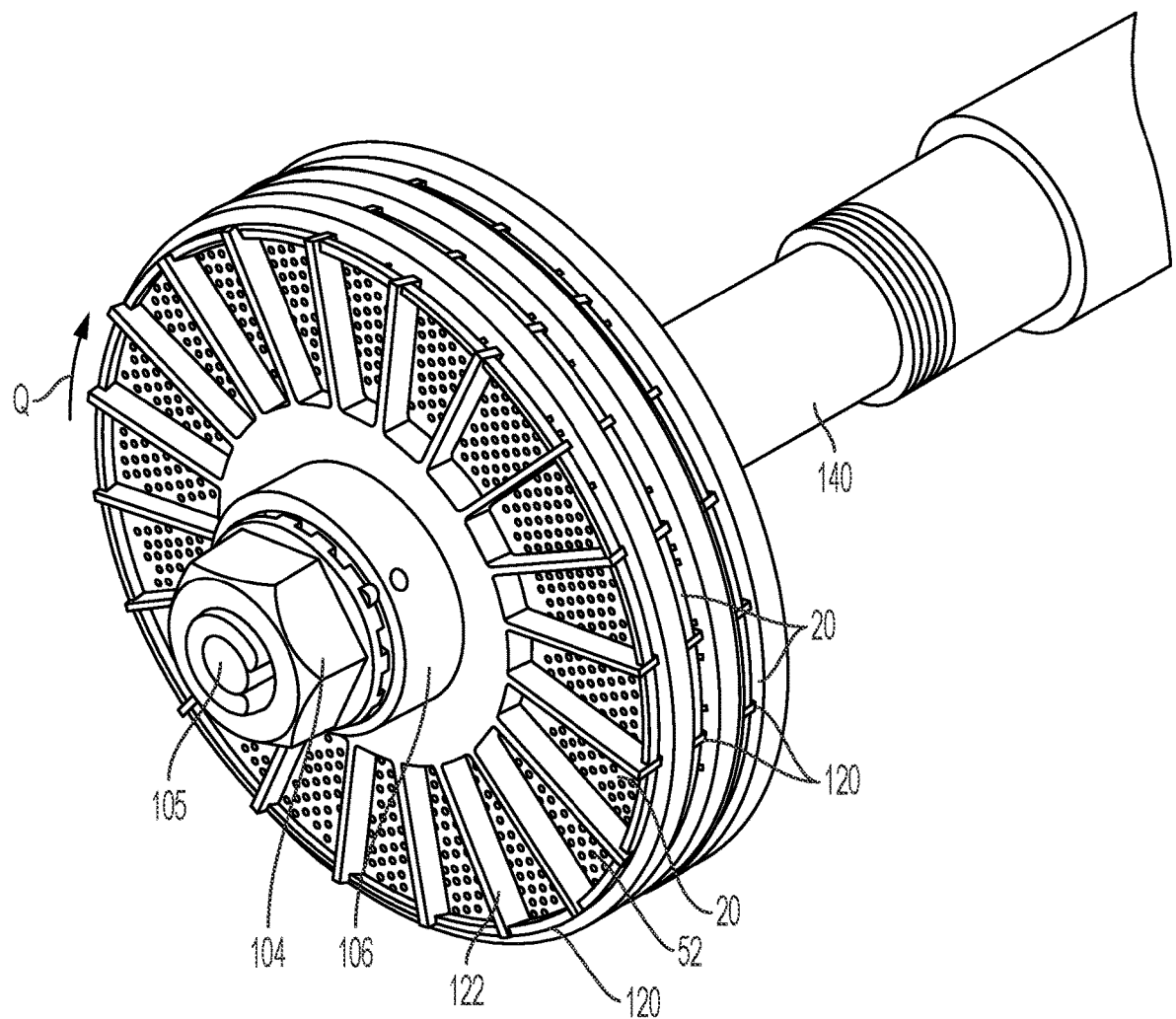
FIG. 2 is a perspective view of a distal end of the emulsion device of FIG. 1, depicting a first emulsion plate.
Figure 7:
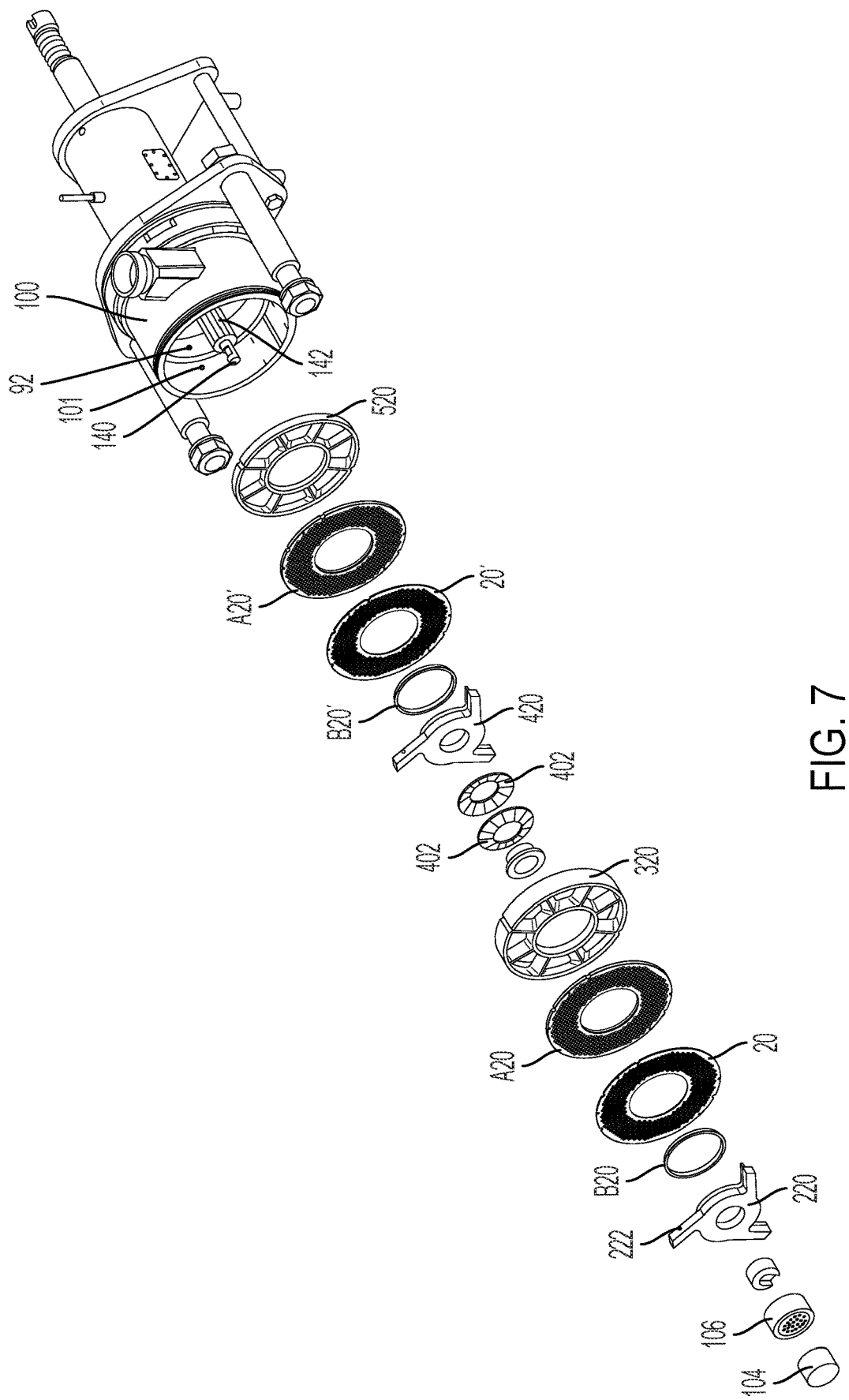
FIG. 7 is an exploded view if an emulsion system similar to the device of FIG. 1, which includes several emulsion plate assemblies instead of single emulsion plates.

Turning now to FIGS. 1, 2, and 7, the emulsion or grinding device 10 is provided. The device 10 may include a housing 100 that supports and encloses the components of the emulsion system, including the rotatable knives (120, 320, 520, 720), and the plates 20, 20', 20" and in some embodiments plate assemblies (e.g. combination of elements 20 and 220). In some embodiments, particularly in embodiments where the device is a zero tension system, the plurality of plates 20 and knives 120 are arranged in alternating fashion such that knives across both front and rear surfaces of each plate (possibly excluding cutting across the rear surface of the final plate in the assembly). The plates 20, as discussed in detail below, are supported on both sides by radial arm surfaces 122 of each knife 120. The radial arms 122 support the plate 20 in both direction against forces imparted upon the faces of the plate 20 (due to the force of the pump or vacuum and the force of the food product being pressed against the front and potentially back surfaces of each plate 20). As discussed below, the plate 20 has a width that is substantially thinner than conventional plates (about 0.07 inches, or within a range of about 0.05 inches to about 0.1 inches including all values within this range—in comparison to conventional emulsion plates that are typically about 0.375 inches—for embodiments where the diameter of the emulsion plates are about 5 inches, about 7 inches, or about 9 inches which are commonly implemented in conventional emulsion machines). While the emulsion plate 20 is much thinner than conventional emulsion plates, it has been determined that the plate 20 can withstand the anticipated forces/pressures applied to the faces of the plate 20 during normal operations (to a sufficient factor of safety for the industry) without the need for a rigid backing plate butting against a face of the plate to provide extra strength for one or more plates 20 that are disposed in an array of plates and knives. In some embodiments at least the rearmost plate 20 may include a plate assembly assemblies (including a plate 20 and a backing plate A20, as discussed below) to the forces that are applied upon the face of the plate due to the pressure of the food traveling therethrough.

It will be appreciated by one of ordinary skill in the art after a thorough review of this specification, that the use of emulsion plates 20 that are significantly less wide than conventional emulsion plates will provide several advantages. Some of these advantages are: (i) the emulsion holes 52 are shorter (direction parallel to the width of the plate) which reduces the resistance to flow of the food product through the holes 52, and (ii) also decreases the particle size in the direction of the food flow through the hole 52 as the knives 120 across the front and rear surfaces will tend to cut the food product that flows through the hole 52. Another advantage (iii) is that because particle size in the direction of flow is decreased (which is a function of the width of the plate 20) generally the hole 52 diameter can be increased on each plate 20 (as compared to plates with conventional thicknesses) and still achieve the same particle reduction per plate 20 as with conventional plates, which provides a further reduction to resistance to food flow through the emulsion plates 20. Because of this reduced resistance to food flow through the plates 20, generally less pressure or vacuum can be used to urge the food product to flow through the assembly of plates and knives, (iv) which will lower the temperature change of the food product as it flows through the plates 20 and knives than the temperature increase typical with assemblies that use conventional plate widths.

The housing 100 may rotatable support a shaft 140 that is disposed within a housing 100. The shaft 140 supports a plurality of knives that are disposed in an alternating and arrangement with a plurality of plates 20. In some embodiments, the elements may be arranged (away from the distal end 140a of the shaft 140 and toward the outlet of the housing)—knife, plate, knife, plate and so on, and in some embodiments finished with a knife. In other embodiments, two cutting assemblies and plates may be provided in the same order, on other embodiments three knives may be provided with two plates disposed between the three knives.

As discussed in further detail below, the knives (e.g. 120) rotate with rotation of the shaft 140 (direction Q), while the plates 20 are fixed with respect to the housing. The housing 100 may be connected to a vacuum or other source of suction at an output 8 of the housing, which pulls the food product through the holes 52 within the plurality of plates 20, and in the presence of rotating knives (e.g. 120), which shear the food product in smaller and smaller sizes.

Alternatively, product can be pumped through the housing and the plates and rotating knives with the higher inlet pressure pushing the food product therethrough. The plurality of knives (120) and plates are disposed upon the shaft 140 and maintained in position with a 106 that rotates along with the shaft 140, and a nut 104 may be provided to maintain the collar 106 in position. In some embodiments, the shaft 140 may include a spline 142 provided proximate to the distal end 140a of shaft. The spline 142 may include a plurality of teeth that mate similar features 123a that are formed in the center hole 123 of the knife 120 to transfer torque from the shaft 140 to the knife 120. The plate 20 includes a center hole 24 that is larger than the spline 142 and therefore the shaft 140 spins freely within the center hole 24. The center hole 24 of the plate 20 has a diameter Z. The plate 20 has an outer diameter (along its edge 23) Y.

In some embodiments, the knives 120 include a center hub and plurality of knife edges that extend radially from the center member. The knife edges either come very close to the adjacent face of the plate 20 disposed next to the knife or make contact with the adjacent of the plate 20. As discussed above, a motive force (vacuum or positive pressure or gravity—potentially in combination with vacuum or positive pressure) is applied to press the food product against the surface of the plate and enter into the emulsion holes 52 within the plate. As the knives 120 rotate, the knife edge moves across the hole 52 (on the front face 21 of the plate 20, which shears the food that enters the hole from the remainder of the food, which creates a small piece of food (similar to the diameter of the emulsion hole 52). In some embodiments there are knives that also shear food pieces that exit the emulsion hole 52 from the rear side 22 of the plate 20.

The plates 20 are best shown in FIGS. 3-6a. As an initial note, in many emulsion systems multiple plates 20 are provided in series, with plates with relatively large emulsion holes 52 provided initially and then plates have sequentially smaller emulsion holes 52 to provide for ever smaller cut pieces as food product flows through the housing 100. The specification and drawings disclose multiple plates with the annotation of including a series of increasing apostrophes (') for further plates. The plates within the housing will be constructed in generally the same manner, with the use of one or more apostrophes (') used to designate further plates in the device 10. The plates 20 may be circular. In other embodiments, the plates may be other shapes, such as oval.

In some embodiments, each successive plate 20 is the same component, i.e. with the same number of holes 52, the same spacing and pattern of holes 52, and with the same diameter of holes 52. In other embodiments, a first plate 20 may have holes with a first diameter, spacing, etc. while successive plates 20 (which the food product would reach after passing through a hole in the first plate) may have holes with a smaller diameter, larger spacing between adjacent holes, a different hole pattern, all by way of example. The plate 20 may include a first surface 21 that faces toward the inlet of the housing (or the distal end 140a of the shaft 140) and an opposite second surface 22 that faces toward the outlet 8 of the housing.

In some embodiments, the each plate 20 may have a plurality of holes 52 each with the same diameter (uniform diameter), while in other embodiments, plates 20 may have a plurality of emulsion holes of with different diameters, such as an increasing diameter as the emulsion holes extend radially outward from a center hole 24 of the plate.

In some embodiments, the emulsion holes 52 are provided radially outward from the center hole 24 in a geometric pattern, which may include consistent spacing from adjacent holes—either consistent spacing in all directions, or in other embodiments, consistent spacing of adjacent holes along a row, and another consistent spacing between adjacent emulsion holes 52 that are provided in different rows.

Figure 3B:
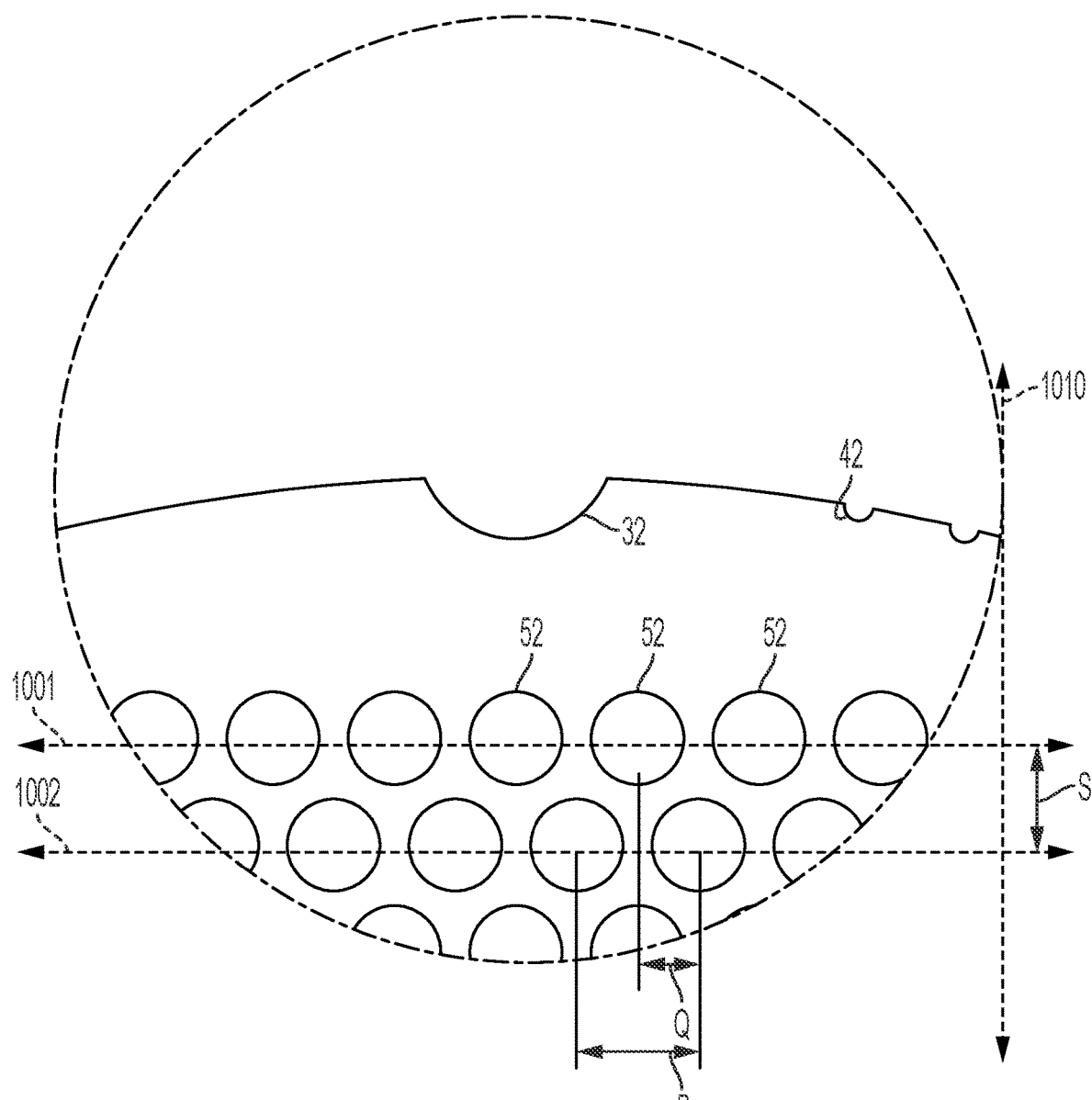
FIG. 3B is a view of detail A of FIG. 3.

By way of example, and with reference to FIGS. 3 and 3B, an embodiment of an emulsion plate 20 is provided. The plate includes a plurality of emulsion holes that are disposed in a plurality of parallel rows, such as row 1001. In some embodiments the plurality of emulsion holes 52 may be with consistent spacing so that the plurality of holes also are arranged in one or two additional sets of parallel rows (1003, 1005, FIG. 3) that extend in different directions.

With reference to FIG. 3B, adjacent holes 52 within the same row may be spaced at consistent spacing (R—spacing between hole centers is used by default here), with adjacent holes within differing rows also spaced at the consistent spacing R. In this embodiment, adjacent emulsion holes 52 that are disposed in neighboring rows may be spaced at a different consistent spacing (S) in a radial direction i.e. in a direction 1010 which is perpendicular to the direction of the centers of each of parallel rows 1001 and 1002. In this embodiment, the centers of adjacent holes within two different rows (e.g. 1001 and 1002) are at a distance Q measured parallel to the direction of rows 1001 and 1002, and in this embodiment distance Q is equal to ½ of distance R. In a preferred embodiment, a distance R may be 1.0 mm plus the uniform diameter of each emulsion hole 52, and the distance S may be 0.5 mm plus the uniform diameter of each emulsion hole 52. These distances may be maintained for plates 20 with differing hole sizes, and may be modified based upon desired operational performance and design constraints as explained below. One of ordinary skill in the art with a thorough review and understanding of this specification would be able to provide a plate design with a plurality of holes 52 with a desired spacing without undue experimentation and only routine optimization in view of the dual goals of providing a large number of emulsion holes for food to pass through and constructing a plate 20 that can withstand the possible pressures imparted upon the plate 20 during use with a sufficient factor of safety. In some embodiments, and particularly for plates with relatively small outer diameters, such as 5.0 inches, the plurality of holes 52 may be aligned in a circular manner around the plate, such as with a plurality of holes 52 collectively aligned at a first radius, and further pluralities of holes collectively aligned at various larger radii. In some embodiments, the placement of the holes may be staggered so that holes aligned along neighboring pluralities of holes along a single radius are not aligned along a single radial line—which allows adjacent pluralities of holes 52 to be positioned at radial distances apart that are smaller than the diameter of the holes 52 of the holes.

Figure 4A:
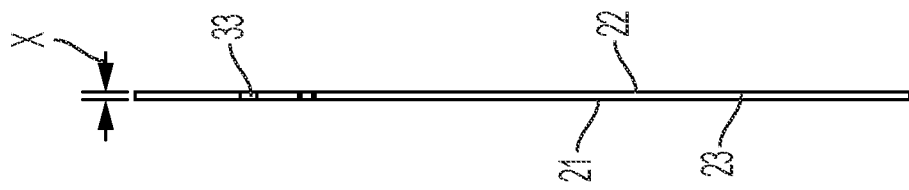
FIG. 4A is a side (edge) view of the first emulsion plate of FIG. 4.
Figure 4:
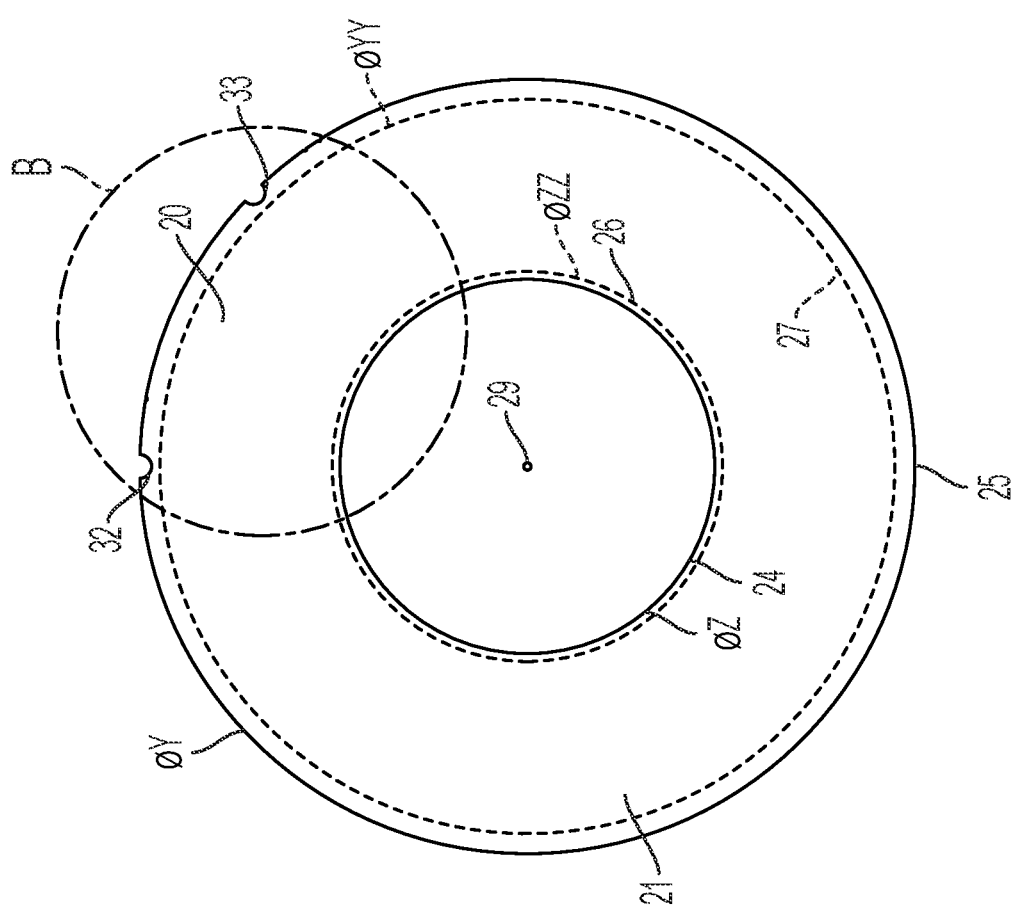
FIG. 4 is a front view of a first emulsion plate usable in the emulsion device of FIG. 1.

In some embodiments and with reference to FIG. 4, all of the plurality of emulsion holes 52 within a plate 20 may be disposed outside of a first circle 26 with a diameter (ZZ) that is just larger than the center hole 24 of the emulsion plate 20 and inside a second circle 27 that is disposed inside of the outer edge 23 of the plate 20. In some embodiments, the first circle 26 may have a diameter that is about 0.3 inches greater than the diameter of the second hole, and the second circle 27 may have a diameter (YY) that is about 0.5 inches less than the diameter of the plate 20. The distance between the second circle 27 and the diameter of the plate should be significantly larger than the penetration depth of the first indentations 32, 33 (discussed herein—specifically a circle that contacts the maximum penetration depth of the first indentations tangentially) such that there is sufficient material between the first indentation 32, 33 and adjacent emulsion holes 52 to the first indentations. This minimum space (and therefore the difference in diameter between the plate diameter and the second circle 27) would be understood by one of ordinary skill in the art with a thorough review and understanding of this specification would appreciate that this is a function of the strength properties of the material used for the plate as well as the geometry (especially the width) of the plate 20. This difference would also be a function of the difference in knife 120 radius and plate 20 size, if any.

As discussed herein, the emulsion device 10 may be used with multiple plates 20 that have decreasing diameter holes 52 (in some embodiments plates have uniform diameter holes), such that the food pieces are cut in to smaller and smaller pieces (to emulsify the food that passes therethrough) as the food passes through the device 10. In some embodiments plates with the following uniform diameter holes 52 may be available and the end user will select the desired plates (with differing uniform hole sizes) to properly emulsify the food. Plates may be selected from (by way of example and not be limiting unless specifically designated): 1.0 mm, 1.2 mm, 1.4 mm, 1.6 mm, 2.0 mm, 2.4 mm, 3.2 mm, 4.0 mm, 4.8 mm, 5.6 mm, 6.3 mm, 7.2 mm, 8.0 mm, and 9.9 mm. Other emulsion hole sizes may be provided. As can be understood, the number of emulsion holes 52 that are provided upon a plate 20 is a function of hole size, and the spacing between adjacent holes is a function of material strength, plate dimensions, and hole (uniform or not) diameter.

In some embodiments, the plates 20 may be keyed to the housing 100, such as with a plurality of first indentations 32, 33 that are disposed in a spaced arrangement along an outer circumferential edge 23 that key with corresponding projections 92 (FIG. 7) in the housing 100, which serve to rotationally fix the plates 20 with respect to the housing 100, but allow the plates 20 to move longitudinally along the housing 100, for adjustment purposes as well as to readily assemble and disassemble the device 10. In some embodiments the first indentations may be spaced at a radial distance T—which in some embodiments is 45 degrees. The radial distance is somewhat arbitrary and can be different radial distances, as long as the housing 100 is keyed with the projections at the same radial distance as the first indentations 32, 33. Alternatively, the plates 20 may include one or more projections that key within indentations within the housing 20. In other embodiments, the plates 20 may include projections that radially extend from the circumferential edge, and the housing may include corresponding first indentations. In other embodiments, the plate and housing may each have one (or more) projections and one (or more) indentations that are positioned for engagement between the respective projections and indentations.

In some embodiments, the plates 20 (20', 20", etc.) may be constructed with a very thin and uniform width, i.e. with a very thin uniform outer circumferential edge 23. In some embodiments, the plates 20 are manufactured with a width (X) of about 0.070 inches with parallel front and rear face surfaces 21, 22. This plate 20 is much thinner than the width of any emulsion plates of similar (conventional) sizes that are currently used in the industry for emulsion of food— such as for hot dogs, sausage, or for emulsifying food for pet food. Typical conventional emulsion plates for standard diameter plates (which typically are available in 5, 7, and 9 inch diameters) are typically about 00.25 inches, 0.31 inches (for 5 and 7 inch diameter plates, respectively. Nine inch wide plates with holes that are holes that are 1.00 mm and lower are 0.312 inches thick, while nine inch plates with holes larger than 1.00 mm are 0.375 inches thick. As can be understood, the thickness of the plates is determined by the pressure within the system, with average pressures that may reach 100 psi and peak pressures that may reach up to 200 psi.

The emulsion plate 20, with a much thinner width than conventional plates, is believed to be a beneficial development in art of emulsion systems and is expected to encounter significant commercial success. As discussed above, often users of emulsion systems do not have the wherewithal, facilities, or the interest in machining worn emulsion plates in order to restore their faces to a smooth surface for continued use. These users typically will need to maintain many sets of emulsion plates (i.e. sets of plates of varying emulsion hole diameters) in inventory so that they can maintain machine use when other sets of plates are sent to a vendor or to the manufacturer for machining to restore the proper face finish. For users that are in certain countries, there are not qualified vendors that are capable to machine worn plates to the specifications for safe continued use—and therefore these customers often ship the plates to the manufacturer to be re-machined. This shipment entails a time delay (shipping plus the manufacturer's queue for machining) as well as shipping costs, and in some instances requires the payment of import/export duties be paid for the international shipment (which may need to be paid multiple times during the useful life of the emulsion plates).

The use of emulsion plates 20 with a very thin width, such as within a range of about 0.050 inches to about 0.1 inch, including all widths within this range, and specifically including about 0.060 inches, about 0.070 inches, about 0.080 inches and about 0.090 inches is beneficial because the emulsion plate is manufactured with a width that is minimized (and therefore a volume of material is minimized) to reduce the cost of manufacturing and therefore the manufacturers' selling price to maintain an appropriate margin to a cost that makes the emulsion plates disposable (recyclable) once their surface finish is worn, rather than needing to re-machine the plates. While users will periodically need to purchase new emulsion plates 20 more often than conventional plates currently need to be purchased, the cost to purchase and receive the plates (including shipping costs, and for users that are in a different country than the manufacturer the elimination of multiple import/export duties being payable during the life of the plate) may be less than the all-in cost of plates that need to be re-machined one or more times over their useful life. Also, user inventory control would likely be much more predictable than with conventional plates that need to be periodically be machined.

Figure 5:
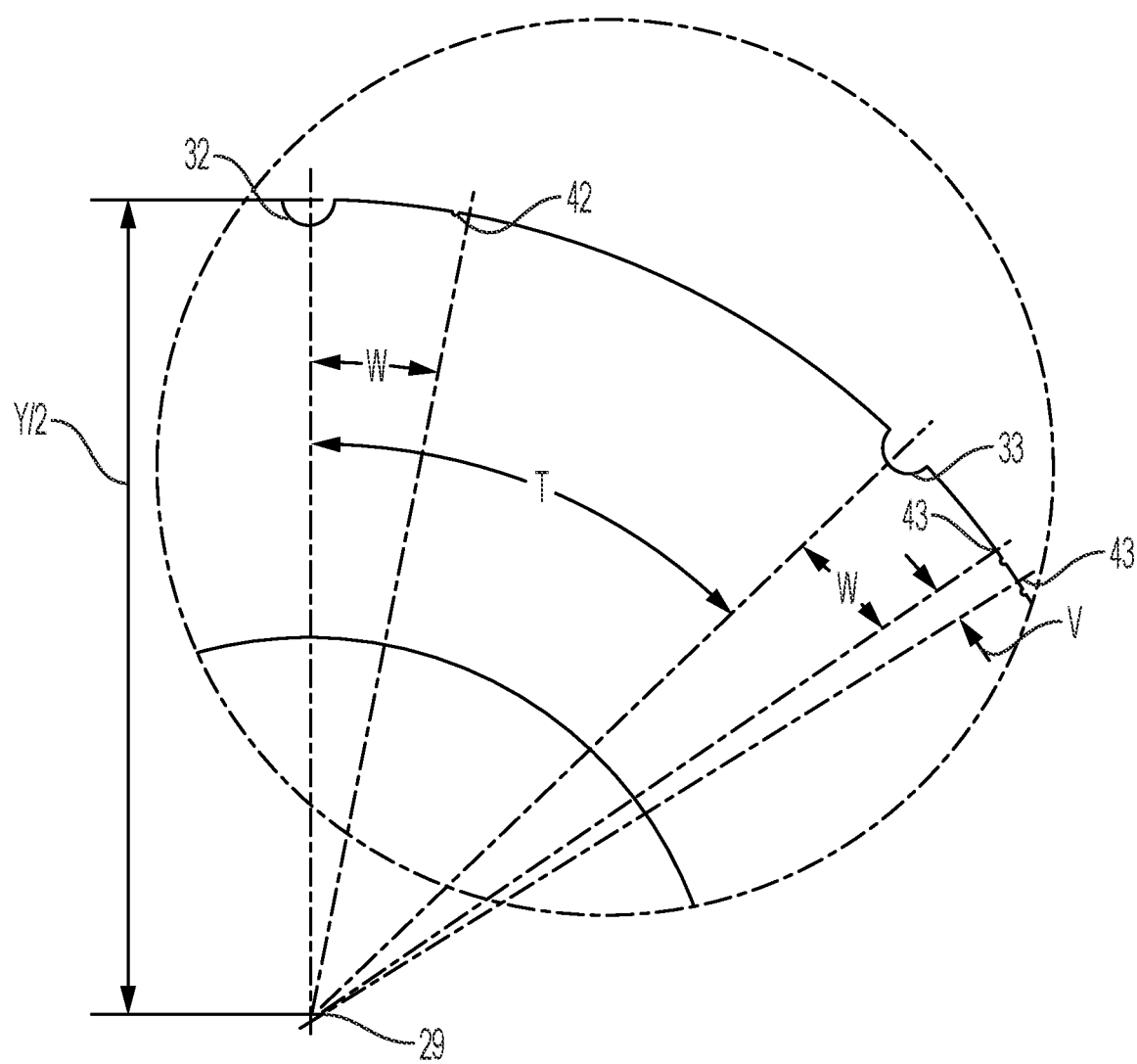
FIG. 5 is a view of detail B of FIG. 4, depicting one indentation from a first set of second indentations and two indentations from a second set of second indentations to represent that the emulsion hole size in the plate (emulsion holes not shown) are 1.2 mm in diameter.
Figure 6:
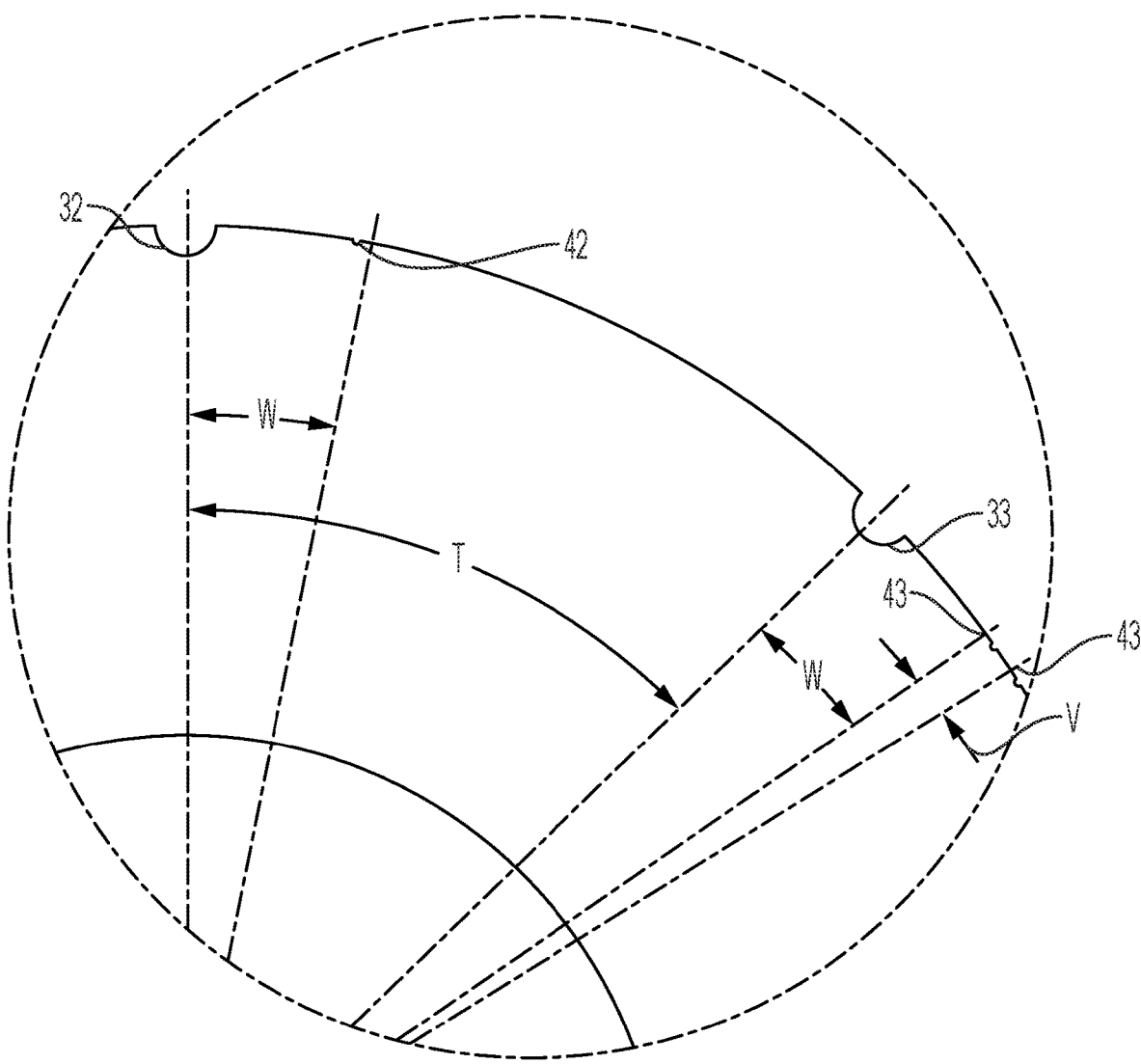
FIG. 6 is a further zoomed in view of the view of FIG. 5.
Figure 6A:
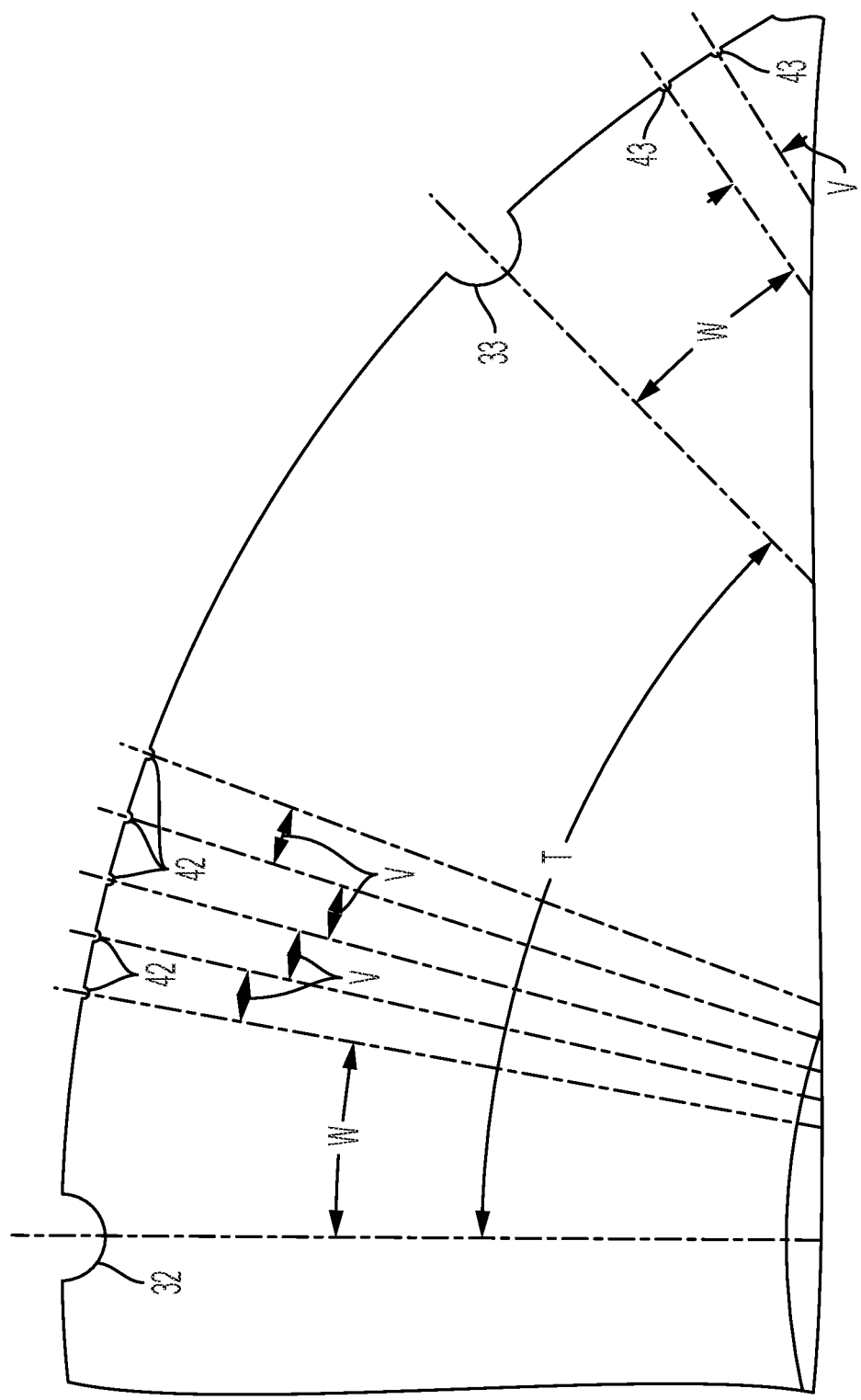
FIG. 6a is a modified further zoomed in view of the view of FIG. 5 with a different arrangement of the second set of indentations, depicting five indentations from a first set of second indentations and two indentations from a second set of second indentations to represent that the emulsion hole size in the plate (emulsion holes now shown) are 5.2 mm in diameter.

In embodiments where the plates 20 have a very thin width (e.g. between 0.050 and 0.10 inches), the circumferential edge 23 of the plate 20 may include first and second sets of second indentations 42, 43, which are best shown in FIGS. 5, 6, and 6a. The first and second sets of second indentations 42, 43 are provided to establish a visual, and in some embodiments a tactile identification of the diameter, and in some embodiments uniform diameter, of the emulsion holes 52 within the emulsion plate 20. For example, when emulsion plates 20 are constructed to be narrow (i.e. at widths that are smaller than the widths of conventional emulsion plates of 5, 7, or 9 inch circumference—such as between about 0.050 inches and about 0.1 inches) it is difficult or impossible to include a printed designation of the emulsion hole size diameter upon the outer circumferential edge 23 of the emulsion plate, which is where the emulsion hole diameter is typically provided on conventional emulsion plates. It is possible, but often not desired to provide the diameter of the emulsion holes upon one of the faces 21, 22 of the plate, but that is not desirable because the printing (if screen printed or the like) often wears off quickly with use due to the knives 122 scraping the face 21/22 of the emulsion plate 20. Similarly, it is not desired to emboss or otherwise mechanically alter the face of the plate with the uniform diameter because that might create accelerated wear of the plate.

Accordingly, it has been found that it is convenient for the manufacturer and for the user to identify the diameter (uniform diameter) of the emulsion holes 52 based upon identifiable number of second indentations that are grouped into a first set 42 and a second set 43. With reference to FIG. 6 a first embodiment is provided that includes one indentation within the first set of indentations 42 and two indentations within the second set of second indentations 43. The number of indentations in the first set of second indentations 42 (one in FIG. 6) is equivalent to the number of whole numbers of the diameter (in this embodiment in mm), i.e. 1 mm. The number of indentations within the second set of second indentations 43 (two in FIG. 6) is equivalent to the first (tenths) decimal place of the diameter (in this embodiment in mm), i.e. 0.2 mm. Accordingly, the second indentations (42, 43) designates that the uniform diameter of the holes on the plate 20 is 1.2 mm. FIG. 6A is a second embodiment with five indentations in the first set of second indentations 42 and two indentations in the second set of second indentations 43—which designates that the uniform diameter of holes on the plate is 5.2 mm. Other numbers of first and second sets of second indentations 42, 43 may be provided to represent uniform diameters of between 0.1 and 9.9 mm (or in dimensions in other units as desired). In embodiments where, for example, the uniform diameter is a whole number (tenths place is zero) then there would be no indentations in the second set of indentations 43. Similarly if the diameter was less than 1 whole number (e.g. diameter was less than 1.0 mm) then there would be no indentations where in the first set of second indentations 42. In this embodiment, there would be no second indentations between the two first indentations 32, 33. In other embodiments, additional sets of second indentations may be provided to allow for representation of numbers with more than two digits, or in other embodiments, to represent perhaps different sized emulsion holes 52 within the same emulsion plate 20. One of ordinary skill in the art with a thorough review and understanding of this specification will contemplate that one or more sets of second indentations may be provided upon the circumferential edge 23 of the plate to identify other aspects of the construction of the plate—such as perhaps the material of the plate or the surface finish of the plate—with the numbers of indentations within the one or more sets of second indentations to designate specific items based upon a legend provided by the manufacturer, and the like.

In the preferred embodiment, the first and second sets of second indentations 42 and 43 are placed on opposite sides of a first indentation 43, which is used to key the emulsion plate 20 to the housing. The placement of the sets 42, 43 on opposite sides of the a first indentation 33 provides a readily perceptible separation between the second indentations to aid the user in quick comprehension of the diameter of the uniform holes 52.

In some embodiments, the size of each of the plurality of second indentations may be the same, or in other embodiments, the size of the indentations within the first set of second indentations 42 may differ from the size of the indentations within the second set of second indentations 43 so that the user may visually and/or tactically differentiate the first and second sets 42, 43 in addition to or instead of their position with respect to the first indentation 33. In some embodiments, the second indentions 42, 43 may be semi-circles (or portions of a circle that are less than half of a circle, but with a constant radius along the indentation) that are formed along the outer edge with a radius within a range of about 0.01 to 0.1 inches, with preferred sizes of 0.02 inches, 0.05, 0.075 inches. In other embodiments the indentations may be a shape other than a semi-circle, such as an arc, a v-shape or the like. In some embodiments, for example, the first indentations may be 0.125 inches—and the second indentations are significantly smaller than the first indentations such that it is not mechanically possible to key the plate 20 to the housing using the second indentations.

In some embodiments, as depicted in FIGS. 6 and 6a, the second indentions within the same set are disposed at a specific, and in some embodiments consistent, radial spacing V from adjacent second indentations within the set, such as 2.5 degrees from adjacent indentations within the same set. Alternatively, the indentations within the first set 42 may be disposed at inconsistent spacing from each other, and/or the indentations within the second set 43 may be disposed at inconsistent spacing from each other. The end most second indentation may be disposed from the neighboring first indentation 32, 33 at a different (and in some embodiments larger) radial spacing W, which in some embodiments may be 10 degrees. As can be understood with reference to FIGS. 6 and 6a, the radial spacing (T) between first indentations 32, 33 should be larger than the combined radial spacing V of the maximum possible second indentations within a set (9-22.5 degrees total) (plus the combined radial length of each second indentation) plus the spacing from the end most second indentation from the adjacent first indentation (e.g. 10 degrees), such that the first indentations should be spaced at a minimum of about 45 degrees (10 degrees+10 degrees+22.5 degrees+the combined radial length of all of the second indentions—estimated to be about 2 degrees in total).

In some embodiments, the second indentations 42, 43 may be painted or screen printed or otherwise coated with a color to identify the uniform hole size at the time of sale, in addition to visual and/or tactile identification based upon the indentation itself.

While the plate 20 as described herein is described as configured for disposable use (without necessitating machining the faces after a certain amount of time of use, or as needed) it is contemplated that other plates—such as plates of conventional widths with a service life that spans one or more times that the faces are machined and in some embodiments re-coated with a coating to prevent wear (as discussed elsewhere herein)—may be provided with first and sets of second indentations that are provided to visually or tactically represent the uniform diameter of the emulsion holes 52 of the plate.

Emulsion plate 20 as disclosed herein and with the features disclosed herein are possible based at least in part upon improvements to the manufacturing process, such as by achieving a very hard surface due to coating the emulsion plate with a Chromium Nitride coating, such as a powder coating, such as with a thickness of between about 2-5 microns coating on all surfaces of the emulsion plate 20. Alternatively or additionally, the manufacturing process of grinding the plates to a finish of no more than 6 Ra has been found to provide a very smooth surface (including at intersections of the emulsion holes 52 and the side surfaces 21, 22) to resist the formation of scrapes or burs during use. Alternatively, the plates may be lapped to a desired finish. Through testing, emulsion plates 20 within the width range discussed above, and with specific widths of 0.070 inches plus or minus 0.010 inches have been found to have sufficient strength for use in the emulsion process in embodiments where knives cut on both sides of the plate 20. These plates have a minimized material mass to optimize the use of plates 20 as a disposal item by end emulsion or grinding users.

A method of manufacturing the plate 20 described herein is provided. The method includes the steps of providing a blank that is suitable for machining into the plate 20. The blank is then machined to a circular disc with flat front and side surfaces and a cylindrical edges. The first indentations 32, 33 are machined into the edge 23 of the blank. The plurality of emulsion holes 52 are machined (drilled, laser cut, etc.) into one of the faces 21, 22 of the blank to become thru holes, with the emulsion holes 52 establishing the desired uniform diameter for the plate 20. Based upon the established uniform diameter, a first set of second indentations 42 are machined into the edge 23 of the blank, and located between the two first indentations 32, 33 such the number of the first set of second indentations 42 is equivalent to the whole number of the uniform diameter of the emulsion holes 52 (e.g. for uniform diameter emulsion holes of 3.2 mm, 3 first set of second indentations are provided). Based upon the established uniform diameter, a second set of second indentations 43 are machined into the edge 23 of the blank, and located on an opposite side of a first indentation 33 from the first set of second indentations 42. The number of the second set of second indentations 43 is equivalent to the tenths place of the uniform diameter (e.g. for the uniform diameter emulsion holes of 3.2 mm, 2 second set of second indentations are provided).

The front and rear surfaces 21, 22 may then be lapped to a smooth surface finish, such as to a smoothness specification of no more than 6 Ra. Other surface finishes based upon the desired use of the blank may be established.

The plate 20 may then be coated to increase the strength and wear performance of the plate. In some embodiments, the plate is coated (which may be via powder coating, or via PVD—Physical Vapor Disposition) with chromium nitride on all surfaces, to establish a chromium nitride thickness of 2-5 microns. After the lapping and coating the plate 20 is polished to 6 Ra or better in order to enhance the wearlife. Chromium Nitride is inert, corrosion resistant and is qualified by at least some regulatory agencies for use in materials that contact food.

In some embodiments, the second set of indentations may be printed or painted so that they are visually perceptible due to the paint/print as well as due to the indentations themselves.

Turning now to FIGS. 7-10A, another embodiment of an emulsion system is provided. The system includes a housing 100 that supports and encloses the components of the emulsion system, including one or a plurality of rotatable knives (120, 320, 520, etc.) and one or a plurality of plate assemblies, each plate assembly including an emulsion plate 20, 20', 20" and a second backing plate A20, A20'. The emulsion plate 20, 20' (etc.) are constructed in the same manner as the emulsion plates described above, and when assembled the rear surface 22 makes contact with a front surface A21 of a corresponding backing plate A20.

The plate assembly as discussed below may be found to be an improvement over conventional emulsion plates, which need to be periodically refinished (such as by grinding or lapping) to maintain suitable face surfaces for emulsion (i.e. to remove burs, sharpen hole edges, etc.). As can be understood, refinishing conventional plates results in a reduction of width of the plate (and therefore the strength of the plate) every time it is refinished. Emulsion plates need to be designed with sufficient strength for the thinnest possible plate during the life of the plate, and a significant design parameter to the strength of the plate is the spacing within the plate between adjacent holes—with enough plate material provided between adjacent holes to maintain the plate's ability to withstand the maximum pressure generated against the faces of the plate during operation with a sufficient factor of safety. As will be understood by one of ordinary skill in the art with a thorough review of the system that uses or a plurality of plate assemblies, the plates 20, A20 that are used in the system do not become thinner during the life of the plate 20 because the plates are designed to be disposable—they are used until both front and back surfaces 21, 23 of the plate become worn and then are replaced rather than machined. The backing plate A20 does not result in significant wear during use. Accordingly, because the combined width of the plate assembly (20, A20 does not decrease with use, the width of the assembly never is reduced and therefore, one of ordinary skill in the art will appreciate after a thorough review and understanding of this specification that the plurality of holes 52, A52 can be placed closer together in the plate assembly of the embodiments discussed below than with conventional plates that need to be periodically ground—therefore resulting in reduced width over the life of the plate. Because the plates 20, A20 can be formed with a plurality of holes 52, A52 that are closer together, there can be more holes per plate assembly, which either increases the food flow rate through the system (at a constant differential pressure) or allows the system to operate with a lower differential pressure with the same flow rate—or as will be understood a combination of both of these benefits. Also, allowing for operation of the emulsion system at a lower differential pressure, can further reduce the design constraints on the plates (lower possible maximum pressure in the system) which may allow the plates to be designed with even more closer hole 52, A52 spacing. Further or in addition, the amount of spring pressure needed to maintain the system may be reduced. This benefit discussed herein, once understood by one of ordinary skill in the art, will allow the designer to optimize the hole spacing for the required maximum pressure within the system (based upon the known material properties of the plate and its finishing procedures) with only routine optimization.

The plate assembly 20, A20 disclosed herein is provided and can replace conventional emulsion plates within existing emulsion systems without any modifications needed to the system.

Figure 8:
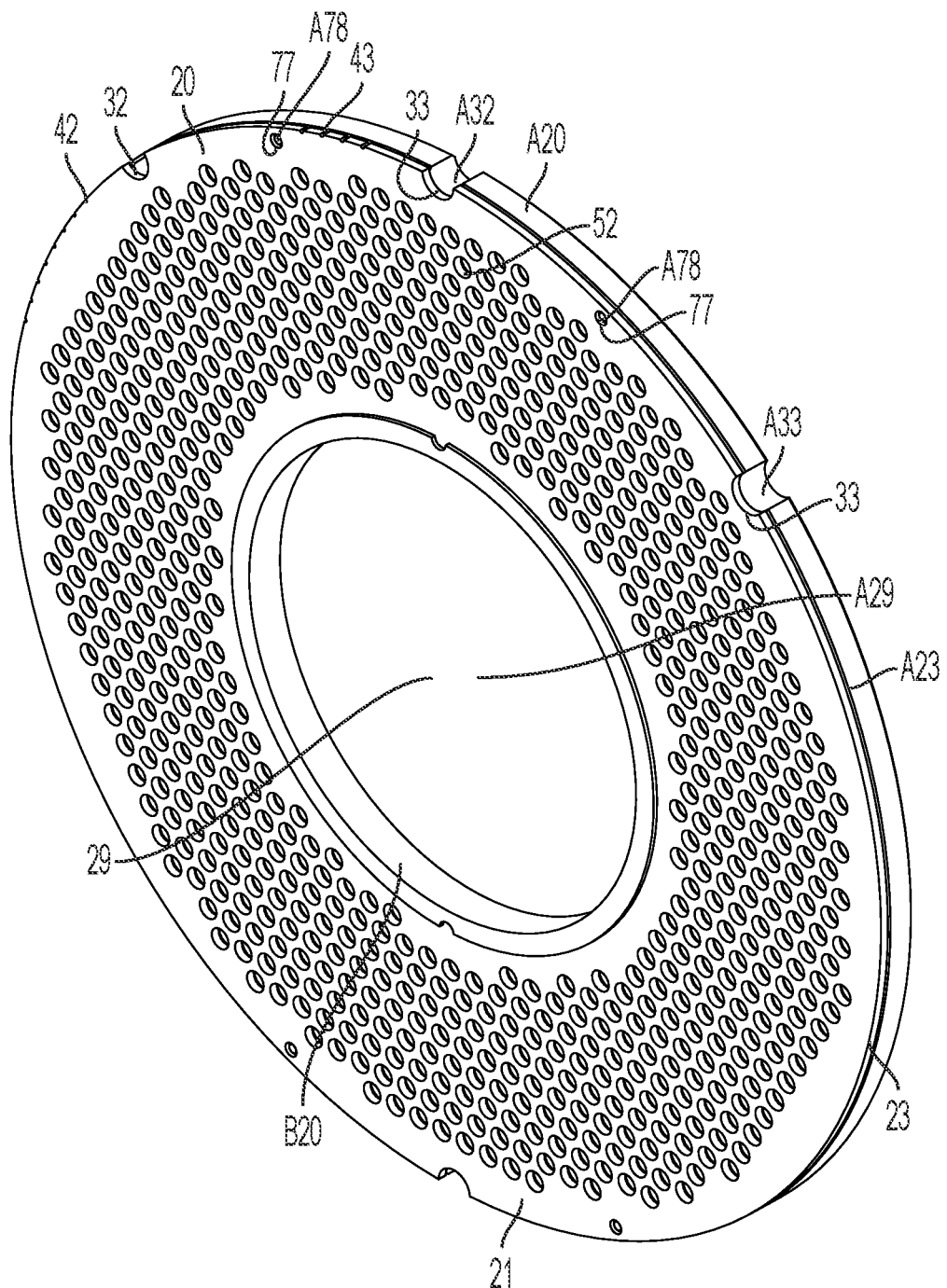
FIG. 8 is a perspective view of an emulsion plate assembly of the system of FIG. 7.
Figure 8A:
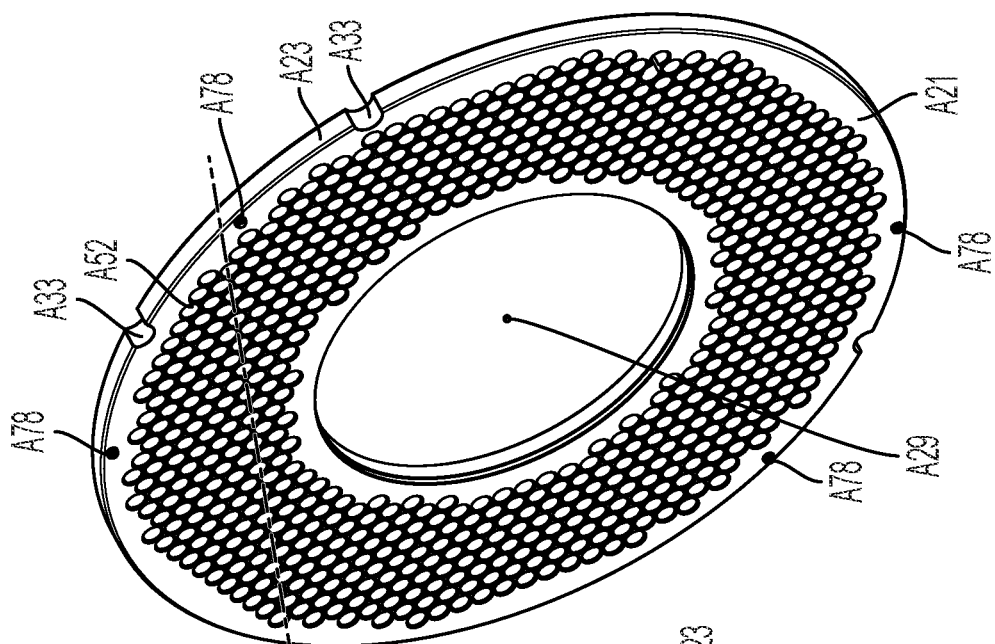
FIG. 8A is an exploded view of the emulsion plate assembly of FIG. 8.
Figure 8A:
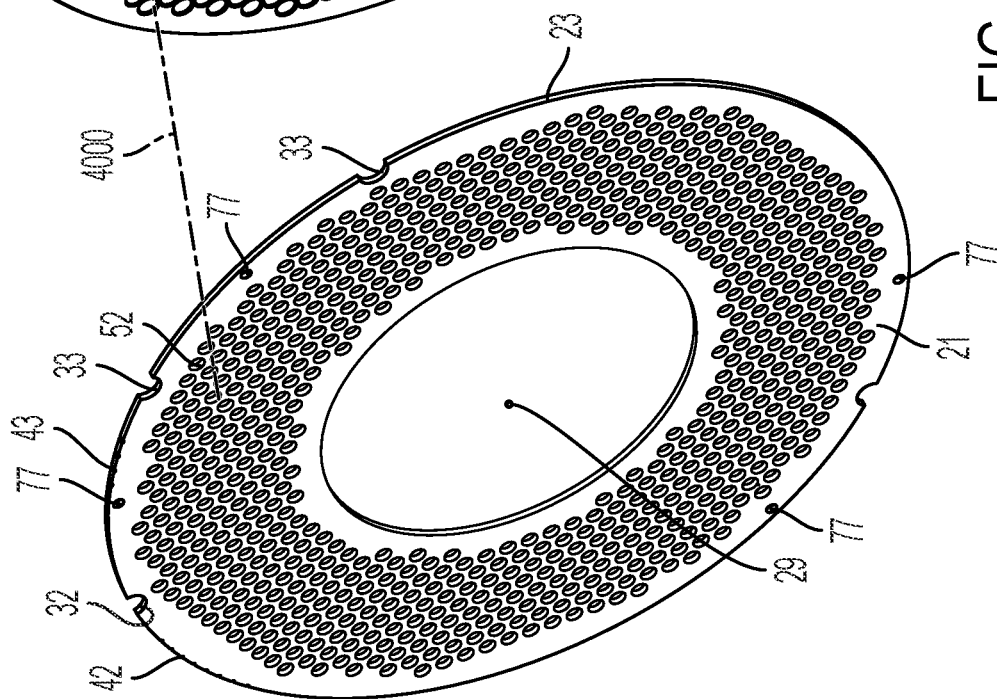
Figure 8A:
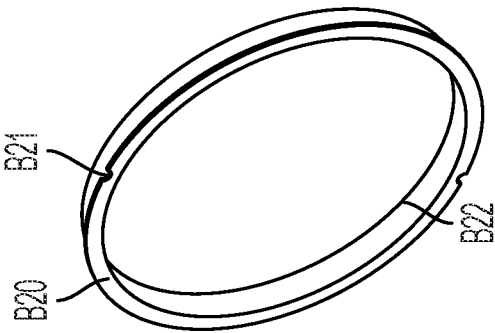

FIG. 8 is a view of a plate assembly with a plate 20 aligned with an contacting a backing plate A20. In some embodiments, a clamp ring B20 may be provided, that contacts the front face 21 of the plate 20 and includes a cylindrical portion B21 that extends within the center holes 29, A29 of the plate 20 and the backing plate A20. FIG. 8A is an exploded view of the plate assembly. In some embodiments, the holes 29, A29 of the plates 20, A20 may be threaded and the clamp ring B20 may be correspondingly threaded to fix the plates 20, A20 and the clamp ring together. The threading of the clamp ring B20 and the plates 20, A20 may be reverse threaded—in the opposite direction of the direction of rotation of the shaft 140. In some embodiments, only inner hole A29 of the backing plate A20 is threaded, and the thinner plate 20 is not threaded, with the diameter of the inner hole 29 such that the threaded cylindrical portion B21 extends through the center hole 29 of the thin plate.

The backing plate A20 may be the same outer diameter as the corresponding plate 20 and is constructed with a larger width than the width of the plate 20. Alternatively, the backing plate A20 may have a slightly smaller or larger outer diameter, such as with a difference on the order of several thousandths of an inch.

The backing plate A20 includes two or more first indentations A33 that when assembled align with corresponding indentations 33 on the plate 20. As discussed above, the indentations A33 (33) key with projections 92 upon the housing 100 to fix the plates 20, A20 with respect to the housing. In some embodiments, the plates 20, A20 have the same number of indentations, which are spaced at the same circumferential locations about the outer edges 23, A23 to maintain the plates 20, A20 aligned, as discussed further below. In some embodiments, the plate 20 may have an extra projection 32 (FIG. 8) that is provided to provide a visually perceptible separation between the first and second sets of second indentations 42, 42, as discussed above. In these embodiments, the backing plate A20 may not include a corresponding indentation that corresponds to the separating indentation 32 (FIG. 8), while in other embodiments, the backing plate A20 may include a corresponding indentation and these indentations may interact with a projection 92 in the housing. The extra projection 32 may be provided on the plate 20 so that both sides of the plate 20 can be used as a forward facing side 21, such that when one of the surfaces 20 of the plate has worn down, the plate 20 can be flipped around so that the previously facing forward face 21 now contacts the forward face A21 of the backing plate. The extra notch 32 once flipped around is positioned at the same position as the notch A33 of the backing plate A20 (with the middle notch inn the plate 20 corresponding with one of the two notches A33 of the backing plate A20 in both positions of the plate 20.

The backing plate A20 may be formed from the same materials and surface finishes and coatings as the plate 20, as discussed above.

Figure 8B:
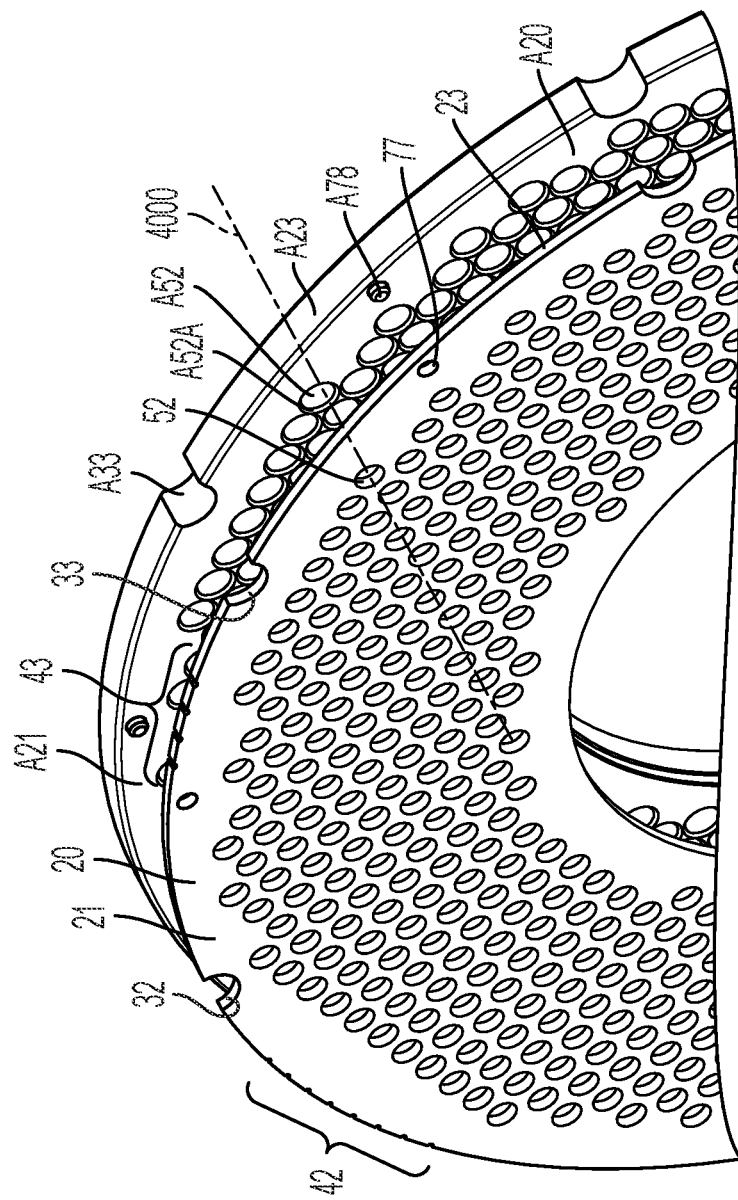
FIG. 8B is a detail exploded view of the emulsion plate assembly of FIG. 8.

The backing plate A20 includes a plurality of emulsion holes A52, and specifically the backing plate A20 may include the same number of holes 52 and in the same alignment as the plurality of holes 52 upon the plate. FIGS. 8-8B depict the same number and alignment of the holes 52, 52A on the plates 20, A20, and line 4000 depicts the centers of the holes 52, A52 aligned together.

In some embodiments, the holes A52 in the backing plate A20 may have the same diameter as the diameter of the holes 52 in the plate 20—which is visually perceptible based upon the number of indentations provided in the first and second sets of indentations 42, 43 as discussed above.

Figure 10:
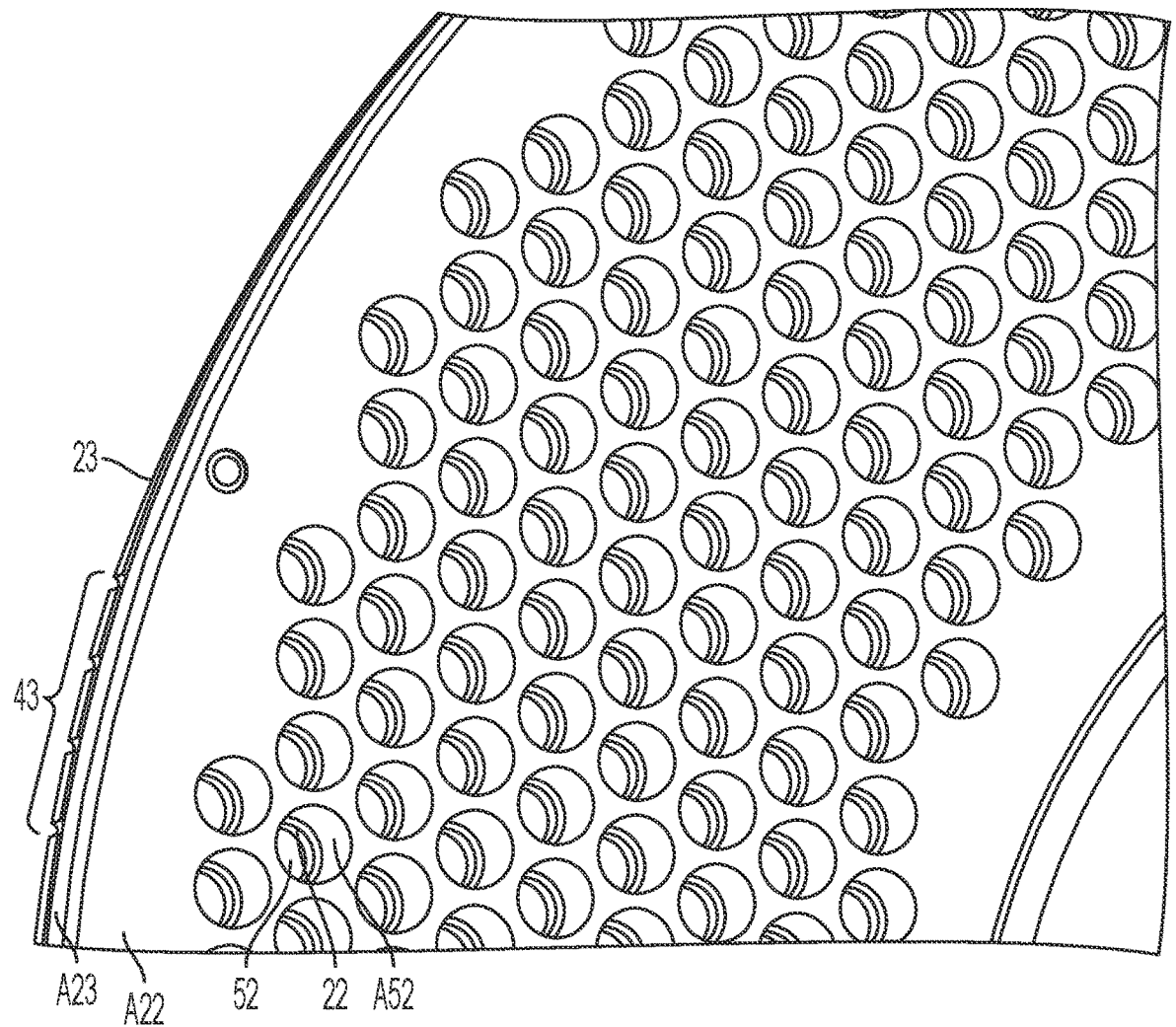
FIG. 10 is a rear perspective detail view of the emulsion plate assembly of FIG. 8.
Figure 10A:
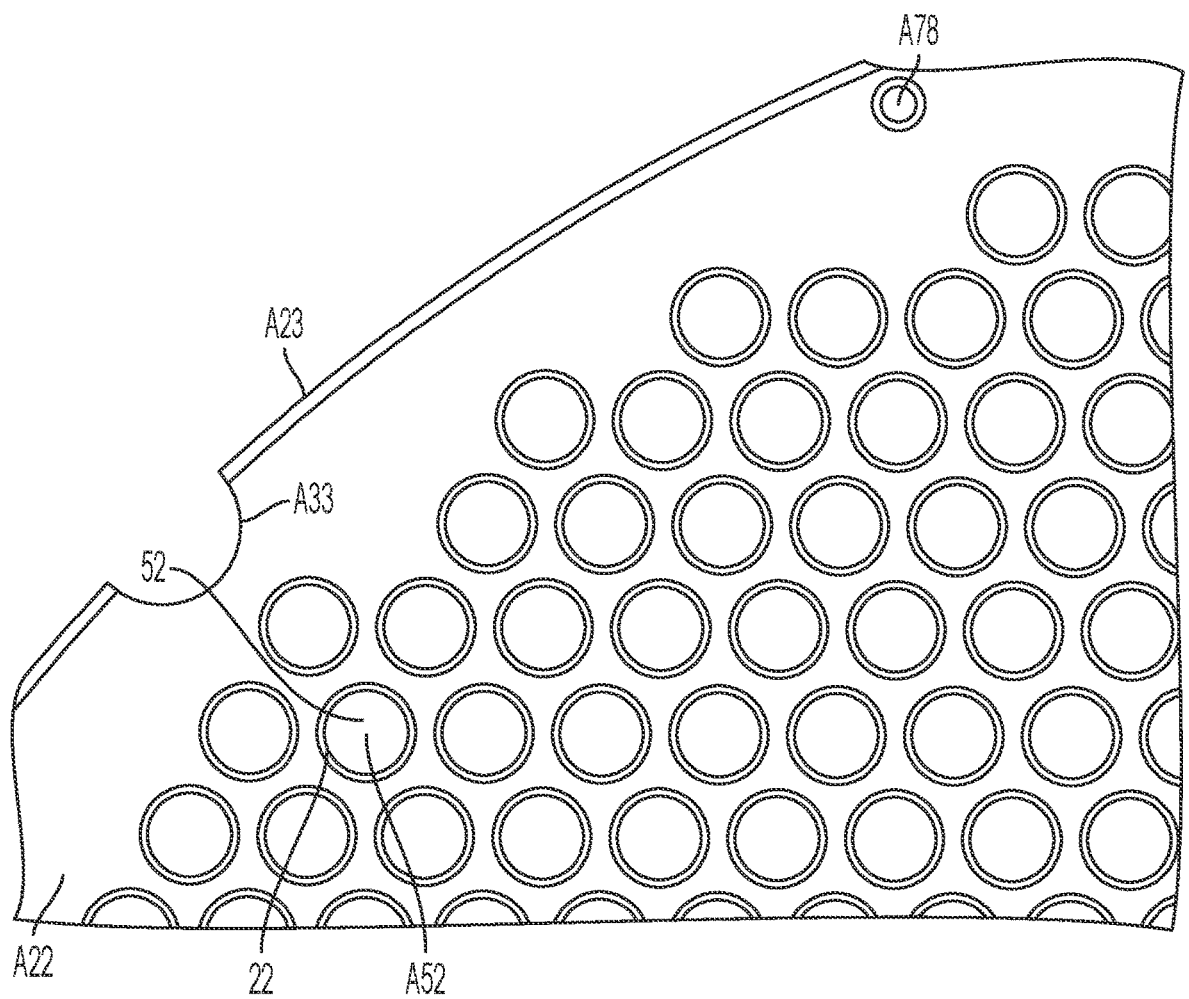
FIG. 10A is a rear detail view of the emulsion plate assembly of FIG. 8.

In some embodiments, and as depicted in FIGS. 10 and 10*a* the holes A52 in the backing plate A20 have larger diameters than the holes 52 in the plate 52. This construction allows the size of the smaller holes 52 in the plate 20 to set the size of the food pieces that extend through the holes 52, but the larger width in the backing plate A20 minimizes the resistance to flow of cut food pieces through the plate assembly, which minimizes the pressure that needs to be applied to the food (or vacuum applied to the food) to cause the desired amount of food flow rate through the plate assembly. In some embodiments, the plurality of holes A52 in the backing plate A20 may have an a diameter that is 33% larger than a diameter of the plurality of holes 52 in the plate, while in other embodiments, the holes A52 may be 20%, 30% larger, or in other embodiments, an increase within the range of 10% to 40% larger inclusive of all values within the range (and the endpoints of the range).

In some embodiments, the holes A52 in the backing plate A20 may include a constant diameter through the width of the holes A52. In other embodiments, the holes A52 may include portions with a changing diameter, and portions with a constant diameter. In other embodiments, the plurality of holes A52 may include portions with two different diameters. In each of these embodiments, the diameter of the plurality of holes A52 is at least the same and often greater than the diameter of the plurality of holes 52 in the plate 20, as discussed above.

Figure 9:
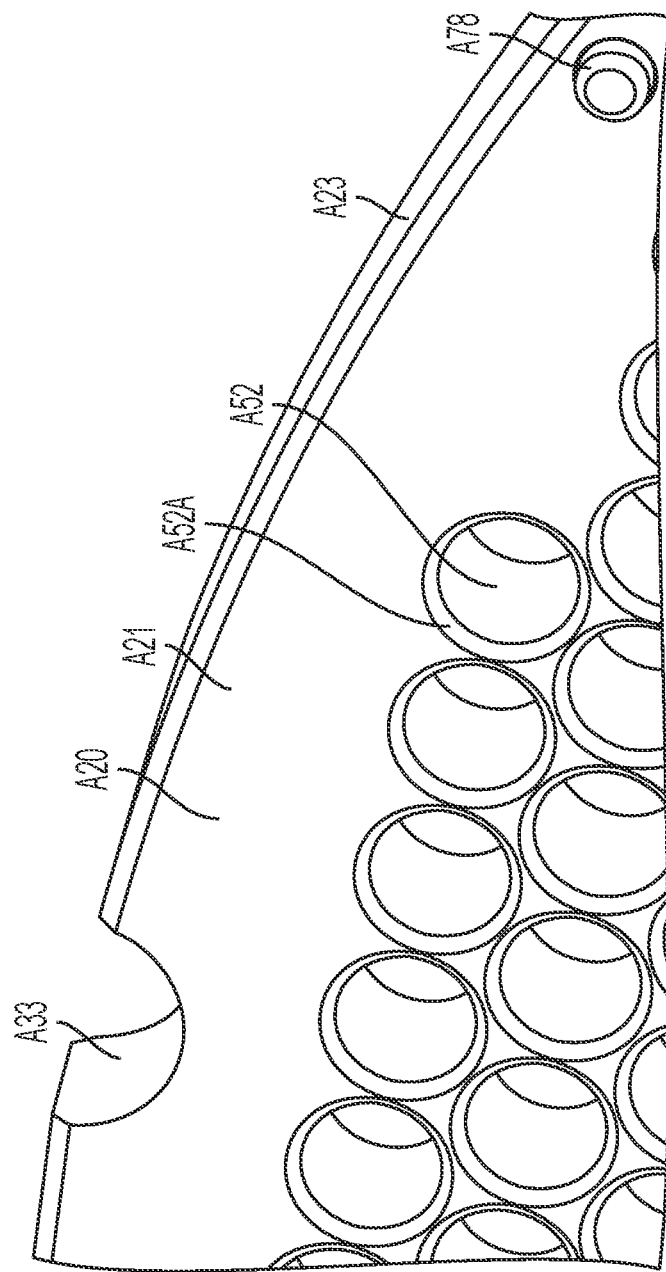
FIG. 9 is a front perspective detail view of a portion of the backing emulsion plate of FIG. 8.

As depicted in FIG. 9, in some embodiments, the plurality of holes A52 in the backing plate A20 may include a varying diameter A52A along a portion of the depth of the holes A52. As depicted in FIG. 9, the holes 52 that extend from the first surface A21 of the plate A20 may include a decreasing diameter along their depth for a portion of the depth of the holes A52, with a remaining portion of the depth of the holes A 52 being a constant depth. This design—with larger diameter portions of the holes A52 at the intersection between the back face 22 of the plate 20 and the front face A21 of the backing plate A20—may be beneficial to allow the food particles that move through the holes 52 in the thin plate 20 to enter in the corresponding aligned holes A52 in the backing plate A20 in instances when the corresponding holes 52, A52 are not aligned perfectly with each other, which would minimize resistance to flow that might be evidenced without the larger portions A52A of the corresponding holes to accept particles and guide them in to the holes A52. The portions A52A with varying diameter may be chamfered portions of the holes. In other embodiments, the portions of holes A52 that extend to the back side A22 may instead or in addition have an increasing diameter toward the back side surface A22.

Through testing, it has been found that the plate 20, A20 designs presented herein with larger holes A52 in the backing plate A20 than in the holes 52 in the plate 20, are beneficial to allow small bones within the food passed therethrough to pass through the holes A52 and subsequently be chopped with the food by the rotating knives 120 and bones do not tend to plug the holes 52, A52 as frequently as is observed with conventional plates that include the same diameter holes as the plate assemblies disclosed herein. It has been found that with the plate assembly disclosed herein a bone removal system is not needed for the system, either as often as with systems that include conventional plates with the same hole sizes, or at all. Similarly, the larger holes A52 in the backing plate A20 allows for frozen food product to be pushed through the system at a lower pressured than with conventional systems.

The plate assembly 20, A20 may be further aligned together with one or more mechanical alignment features that interact between the two plates. For example, as depicted in FIGS. 8-9, the backing plate A20 may include one or several pegs A77 that extend forwardly from the front face A21, and the plate 20 may include corresponding positioned apertures 78 that receive the pegs when the rear face 22 of the plate 20 contacts the front face A21 of the backing plate A20. Through testing it has been determined that the pressures applied to the plate 20 during operation of the system as well as spring pressures within the system are sufficient to maintain the plate 20 and the backing plate A20 in contact, with the pegs A77 provided simply to maintain the holes 52, A52 in registry with each other.

In some embodiments, the system 10 may include one or multiple springs 402 that are positioned about the shaft 140 and between different sets of plates 20/A20 and knives 120. As depicted in FIG. 7, the springs 402 may be positioned between knives 320, 420 that interact with respective plates 20/A20 and 20'/A20'. The springs 402 maintain a compression within the system to ensure that the knives interact with adjacent plates to allow the cutting edges 122 to cut food that enters or exits from emulsion holes 52/A52 in the emulsion plates. The springs 402 also allow for some "play" in the system and maintain contact/spacing between the knife cutting edges 122 and the plate 20/A20 surfaces.

In some embodiments, a system 10 may include two or more emulsion plate assemblies may be provided in a system where only emulsion plate assemblies are used (and no single emulsion plates are used). In other embodiments, one or more emulsion plate assemblies are used, upon the shaft 140, with the shaft also including one or more single emulsion plates.

The term "about" is specifically defined herein to include a range that includes the reference value and plus or minus 5% of the reference value. The term "substantially the same" is satisfied when the width of the end surfaces of the holes are both within the above range. In embodiments where the holes 52 within the plate are not round, the dimensions listed above refer to a major dimension of the hole (such as a width of a rectangular or square hole, or a median cross-sectional distance of a curved, but not round, or an arbitrarily shaped hole).

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification as contemplated by the applicant can be best understood with reference to the following representative paragraphs:

Representative Paragraph 1: An emulsification system, comprising:
  a housing to fixedly support one or more emulsion plates and rotatably support one or more knives that rotate with respect to respective one or more emulsion plates;
  wherein each of the one or more emulsion plates comprises:
    a plate that defines opposite first and second face surfaces and an edge that extends around a circumference of the plate;

a center hole extends through the plate, the center hole adapted to receive a shaft therethrough;

a plurality of emulsion holes disposed radially outward from the center hole, each of the plurality of emulsion holes configured to allow food to pass therethrough, wherein each of the emulsion holes are formed with a uniform diameter;

the edge is a uniform width throughout the circumference of the plate, wherein the edge comprises one or more first indentations that are configured to engage with one or more corresponding projections within the housing to fix the emulsion plate within the housing;

the edge further comprises one or both of a first set of second indentations and a second set of second indentations, wherein each of the second indentations are smaller than the one or more first indentations, wherein the first set of indentations are disposed on a first side of a first indentation of the one or more first indentations and the second set of indentations are disposed on an opposite second side of the first indentation of the one or more first indentations, and wherein the amount of indentations within the first set of second indentations corresponds to a first digit of the uniform diameter of the plurality of emulsion holes, and the amount of indentations of the second set of second indentations corresponds to a second digit of the uniform diameter of the plurality of emulsion holes.

Representative Paragraph 2: The emulsification system of Representative Paragraph 1, wherein the uniform diameter includes a whole number and a first decimal digit, wherein the amount of indentations in the first set of indentations correspond to the whole number of the uniform diameter, and wherein the amount of indentations in the second set of indentations corresponds to the first decimal digit of the uniform diameter.

Representative Paragraph 3: The emulsification system of any one of Representative Paragraphs 1 or 2, wherein each of the indentations within the first set of second indentations are spaced at a consistent spacing from an adjacent indentation within the first set of second indentations.

Representative Paragraph 4: The emulsification system of Representative Paragraph 3, wherein each of the indentations within the second set of second indentations are spaced at a consistent spacing from an adjacent indentation within the second set of second indentations.

Representative Paragraph 5: The emulsification system of any one of Representative Paragraphs 2-4, wherein in instances where the uniform diameter is only a whole number, there are no indentations within the second set of second indentations.

Representative Paragraph 6: The emulsion system of any one of Representative Paragraphs 1-5, wherein the uniform diameter is in mm, wherein the number of indentations in the first set of second indentations corresponds to the number of mm of the uniform diameter, and the number of indentations in the second set of second indentations corresponds to the second digit of the uniform diameter which is number of tenths of mm of the uniform diameter.

Representative Paragraph 7: The emulsion system of any one of Representative Paragraphs 1-6, wherein the first and second faces of the emulsion plate are power coated with chromium nitride.

Representative Paragraph 8: The emulsion system of Representative Paragraph 7, wherein both opposite face surfaces of the emulsion plate are lapped or ground to a roughness finish of at most 6 microns (6 Ra).

Representative Paragraph 9: The emulsion system of any one of Representative Paragraphs 1-8, wherein the emulsion plate has a width along the edge of about 0.070 inches, and wherein the emulsion plate has an outer diameter along its edge of one of about 5 inches, about 7 inches, or about 9 inches.

Representative Paragraph 10: The emulsion system of any one of Representative Paragraphs 1-9, wherein the indentations within the second set of indentations each have a radius that is within a range of about 0.010 to about 0.050 inches.

Representative Paragraph 11: An emulsion plate, comprising:

a plate that defines opposite face surfaces and an edge that extends around a circumference of the plate;

a center hole extends through the plate, the center hole adapted to receive a shaft therethrough;

a plurality of emulsion holes disposed radially outward from the center holes, each of the plurality of emulsion holes configured to allow food to pass therethrough, wherein each of the emulsion holes are formed with a uniform diameter;

the edge is a uniform width throughout the circumference of the plate, wherein the edge comprises one or more first indentations that are configured to engage with one or more corresponding projections within a housing that encloses the plate;

the edge further comprises one or both of a first set of second indentations and a second set of second indentations, wherein each of the second indentations are smaller than the one or more first indentations, wherein the first set of indentations are disposed on a first side of a first indentation of the one or more first indentations and the second set of indentations are disposed on an opposite second side of the first indentation of the one or more first indentations, and wherein the amount of indentations within the first set of second indentations corresponds to a first digit of the uniform diameter, and the amount of indentations of the second set of second indentations corresponds to a second digit of the uniform diameter.

Representative Paragraph 12: The emulsification plate of Representative Paragraph 11, wherein the uniform diameter includes a whole number and a first decimal digit, wherein the amount of indentations in the first set of indentations correspond to the whole number of the uniform diameter, and wherein the amount of indentations in the second set of indentations corresponds to the first decimal digit of the uniform diameter.

Representative Paragraph 13: The emulsification plate of any one of Representative Paragraphs 11-12, wherein each of the indentations within the first set of second indentations are spaced at a consistent spacing from an adjacent indentation within the first set of second indentations.

Representative Paragraph 14: The emulsification plate of Representative Paragraph 13, wherein each of the indentations within the second set of second indentations are spaced at a consistent spacing from an adjacent indentation within the second set of second indentations.

Representative Paragraph 15: The emulsification plate of any one of Representative Paragraphs 11-14, wherein in instances where the uniform diameter is only a whole number, there are no indentations within the second set of second indentations.

Representative Paragraph 16: The emulsion plate of any one of Representative Paragraphs 11-15, wherein the uniform diameter is in mm, wherein the number of indentations in the first set of second indentations corresponds to the number of mm of the uniform diameter, and the number of indentations in the second set of second indentations corresponds to the second digit of the uniform diameter which is number of tenths of mm of the uniform diameter.

Representative Paragraph 17: The emulsion plate of any one of Representative Paragraphs 11-16, wherein the plate has a width along the edge of about 0.070 inches.

Representative Paragraph 18: The emulsion plate of any one of Representative Paragraphs 11-17, wherein the uniform diameter is within a range of about 1.0 mm to about 9.9 mm.

Representative Paragraph 19: The emulsion plate of any one of Representative Paragraphs 11-18, wherein the plurality of emulsion holes are disposed in a geometric pattern.

Representative Paragraph 20: The emulsion plate of any one of Representative Paragraphs 11-19, wherein the plurality of emulsion holes are disposed in a plurality of parallel rows along the face surfaces, wherein the plurality of parallel rows are aligned perpendicular to a line that extends through a center of the center hole and one of the first indentations.

Representative Paragraph 21: The emulsion plate of Representative Paragraph 20, wherein the plurality of emulsion holes are each arranged within a space that is between an inner radial limit and a circular outer radial limit upon the face surfaces, wherein the outer radial limit is a smaller radius than a radius of a circle that contacts tangentially a maximum penetration depth of each of the one or more first indentations.

Representative Paragraph 22: The emulsion plate of Representative Paragraph 20, wherein emulsion holes that are within neighboring parallel rows have centers that are offset from each other, such that centers of emulsion holes in a first parallel row are aligned at a point between adjacent emulsion holes in a second parallel row that is outboard or inboard of the first parallel row.

Representative Paragraph 23: The emulsion plate of Representative Paragraph 22, wherein the centers of adjacent emulsion holes in each parallel row are spaced apart a distance in a direction along the row that is equal to the diameter of each hole plus 1.0 mm, and wherein the centers of the closest emulsion holes in neighboring parallel rows have centers that are spaced apart a distance that is equal to the diameter of each emulsion hole plus 0.5 mm in a direction that is perpendicular to the direction along the row.

Representative Paragraph 24: The emulsion plate of any one of Representative Paragraphs 11-23, wherein both opposite face surfaces of the plate are coated with chromium nitride, which may be via a PVD (Physical Vapor Deposition) process.

Representative Paragraph 25: The emulsion plate of any one of Representative Paragraphs 11-24, wherein both opposite faces surfaces of the plate are finished to a roughness finish of at most 6 microns (6 Ra), which be ground or lapped or polished.

Representative Paragraph 25: The emulsion plate of any one of Representative Paragraphs 14-28, wherein the plate has an outer diameter along its edge of one of about 5 inches, about 7 inches, or about 9 inches.

Representative Paragraph 26: The emulsion plate of any one of Representative Paragraphs 11-25, wherein the indentations within the second set of indentations each have a radius that is within a range of 0.01 to about 0.05 inches.

Representative Paragraph 27: The emulsion system of Representative Paragraphs 1-26, further comprising a second plate with opposite first and second face surfaces and an edge that extends around a circumference of the second plate, a center hole to receive the shaft therethrough, and a plurality of emulsion holes, wherein the plate and the second plate are aligned such that a second face of the plate makes contact with the first face of the second plate, such that the plurality of emulsion holes of the plate are co-axial with the plurality of emulsion holes of the second plate, wherein the plate and the second plate are substantially the same diameter.

Representative Paragraph 28: The emulsion system of Representative Paragraph 27, wherein the plurality of emulsion holes of the plate have a smaller diameter than the plurality of emulsion holes of the second plate.

Representative Paragraph 29: The emulsion system of Representative Paragraphs 27-28, wherein the second plate comprises a plurality of pegs that extend from the first face, and the plate comprises a plurality of apertures that are disposed to receive the plurality of pegs.

Representative Paragraph 30: The emulsion system of Representative Paragraphs 28-29, wherein each of the plurality of emulsion holes of the second plate have a varying diameter through at least a portion of their depth, with a larger first diameter at the first face than a second diameter at the second face.

Representative Paragraph 31: The emulsion system of Representative Paragraphs 28-30, wherein each of the plurality of emulsion holes of the second plate have a chamfered portion that extends from the first face.

Representative Paragraph 32: The emulsion system of Representative Paragraphs 28-31, wherein the diameter of the plurality of emulsion holes in the second plate are about 33% larger than the diameter of the plurality of holes of the first plate.

Representative Paragraph 33: The emulsion system of Representative Paragraphs 27-32, further comprising at least one spring disposed conjunction with the one or more emulsion plates and the one or more knives.

Representative Paragraph 34: The emulsion system of Representative Paragraphs 27-33, further comprising a retaining ring with a first portion that bears against the first face surface of the plate and a cylindrical portion that extends through the center holes of the plate and the second plate.

Representative Paragraph 35: An emulsion plate system, comprising:
    a first plate comprising:
        opposite face surfaces and an edge that extends around a circumference of the plate;
        a center hole extends through the plate, the center hole adapted to receive a shaft therethrough;
        a plurality of emulsion holes disposed radially outward from the center holes, each of the plurality of emulsion holes configured to allow food to pass therethrough, wherein each of the emulsion holes are formed with a uniform diameter;
        the edge is a uniform width throughout the circumference of the plate, wherein the edge comprises one or more first indentations that are configured to engage with one or more corresponding projections within a housing that encloses the plate;
        the edge further comprises one or both of a first set of second indentations and a second set of second indentations, wherein each of the second indentations are smaller than the one or more first indentations,
        wherein the first set of indentations are disposed on a first side of a first indentation of the one or more first indentations and the second set of indentations are disposed on an opposite second side of the first indentation of the one or more first indentations,
wherein the amount of indentations within the first set of second indentations corresponds to a first digit of the uniform diameter, and the amount of indentations of the second set of second indentations corresponds to a second digit of the uniform diameter;
a second plate with opposite first and second face surfaces and an edge that extends around a circumference of the second plate, a center hole to receive the shaft therethrough, and a plurality of emulsion holes, wherein the plate and the second plate are aligned such that a second face of the plate makes contact with the first face of the second plate, such that the plurality of emulsion holes of the plate are co-axial with the plurality of emulsion holes of the second plate, wherein the plate and the second plate are substantially the same diameter.

Representative Paragraph 36: The emulsion plate system of Representative Paragraph 35, wherein the plurality of emulsion holes of the plate have a smaller diameter than the plurality of emulsion holes of the second plate.

Representative Paragraph 37: The emulsion system of Representative Paragraphs 35-36, wherein the second plate comprises a plurality of pegs that extend from the first face, and the plate comprises a plurality of apertures that are disposed to receive the plurality of pegs.

Representative Paragraph 38: The emulsion system of Representative Paragraph 36-37, wherein each of the plurality of emulsion holes of the second plate have a varying diameter through at least a portion of their depth, with a larger first diameter at the first face than a second diameter at the second face.

Representative Paragraph 39: The emulsion system of Representative Paragraph 38, wherein each of the plurality of emulsion holes of the second plate have a chamfered portion that extends from the first face.

Representative Paragraph 40: The emulsion system of Representative Paragraphs 35-39, wherein the diameter of the plurality of emulsion holes in the second plate are about 33% larger than the diameter of the plurality of holes of the first plate.

Representative Paragraph 41: The emulsion system of Representative Paragraphs 35-40, further comprising at least one spring disposed conjunction with the one or more emulsion plates and the one or more knives.

Representative Paragraph 42: The emulsion system of Representative Paragraph 35-41, further comprising a retaining ring with a first portion that bears against the first face surface of the plate and a cylindrical portion that extends through the center holes of the plate and the second plate.

The invention claimed is:

1. An emulsification system, comprising:
a housing to fixedly support one or more emulsion plates and rotatably support one or more knives that rotate with respect to respective one or more emulsion plates;
wherein each of the one or more emulsion plates comprises:
a plate that defines opposite first and second face surfaces and an edge that extends around a circumference of the plate;
a center hole extends through the plate, the center hole adapted to receive a shaft therethrough;
a plurality of emulsion holes disposed radially outward from the center hole, each of the plurality of emulsion holes configured to allow food to pass therethrough, wherein each of the emulsion holes are formed with a uniform diameter;
the edge is a uniform width throughout the circumference of the plate, wherein the edge comprises one or more first indentations that are configured to engage with one or more corresponding projections within the housing to fix the plate within the housing;
the edge further comprises one or both of a first set of second indentations and a second set of second indentations, wherein each of the second indentations are smaller than the one or more first indentations,
wherein the first set of indentations are disposed on a first side of a first indentation of the one or more first indentations and the second set of indentations are disposed on an opposite second side of the first indentation of the one or more first indentations, and
wherein a number of indentations within the first set of second indentations corresponds to a first digit of the uniform diameter of the plurality of emulsion holes, and a number of indentations of the second set of second indentations corresponds to a second digit of the uniform diameter of the plurality of emulsion holes,
further comprising a second plate with opposite first and second face surfaces and an edge that extends around a circumference of the second plate, a center hole to receive the shaft therethrough, and a plurality of emulsion holes, wherein the plate and the second plate are aligned such that the second face surface of the plate makes contact with the first face surface of the second plate, such that the plurality of emulsion holes of the plate are co-axial with the plurality of emulsion holes of the second plate, wherein the plate and the second plate are substantially the same diameter.

2. The emulsification system of claim 1, wherein the uniform diameter includes a whole number and a first decimal digit, wherein the number of indentations in the first set of indentations correspond to the whole number of the uniform diameter, and wherein the number of indentations in the second set of indentations corresponds to the first decimal digit of the uniform diameter.

3. The emulsification system of claim 1, wherein each of the indentations within the first set of second indentations are spaced at a consistent spacing from an adjacent indentation within the first set of second indentations.

4. The emulsification system of claim 3, wherein each of the indentations within the second set of second indentations are spaced at a consistent spacing from an adjacent indentation within the second set of second indentations.

5. The emulsification system of claim 2, wherein in instances where the first decimal digit is zero, there are no indentations within the second set of second indentations.

6. The emulsion system of claim 1, wherein the uniform diameter includes a whole number and a first decimal digit, wherein the uniform diameter is in mm, wherein the number of indentations in the first set of second indentations corresponds to the whole number of mm of the uniform diameter, and the number of indentations in the second set of second indentations corresponds to the first decimal digit of the uniform diameter which is a number of tenths of mm of the uniform diameter.

7. The emulsion system of claim 1, wherein the first and second face surfaces of the plate are coated with chromium nitride.

8. The emulsion system of claim 7, wherein both opposite face surfaces of the plate are finished to a roughness finish of at most 6 microns (6 Ra).

9. The emulsion system of claim 1, wherein the plate has a width along the edge of about 0.070 inches, and wherein the plate has an outer diameter along its edge of one of about 5 inches, about 7 inches, or about 9 inches.

10. The emulsion system of claim 1, wherein the indentations within the second set of indentations each have a radius that is within a range of about 0.010 to about 0.050 inches.

11. The emulsion system of claim 1, wherein the plurality of emulsion holes of the plate have a smaller diameter than the plurality of emulsion holes of the second plate.

12. The emulsion system of claim 1, wherein the second plate comprises a plurality of pegs that extend from the first face, and the plate comprises a plurality of apertures that are disposed to receive the plurality of pegs.

13. The emulsion system of claim 11, wherein each of the plurality of emulsion holes of the second plate have a varying diameter through at least a portion of their depth, with a larger first diameter at the first face than a second diameter at the second face.

14. The emulsion system of claim 13, wherein each of the plurality of emulsion holes of the second plate have a chamfered portion that extends from the first face.

15. The emulsion system of claim 11, wherein the diameter of the plurality of emulsion holes in the second plate are about 33% larger than the diameter of the plurality of holes of the first plate.

16. The emulsion system of claim 1, further comprising at least one spring disposed conjunction with the one or more emulsion plates and the one or more knives.

17. The emulsion system of claim 1, further comprising a retaining ring with a first portion that bears against the first face surface of the plate and a cylindrical portion that extends through the center holes of the plate and the second plate.

18. An emulsion plate system, comprising:
a first plate comprising:
opposite first and second face surfaces and an edge that extends around a circumference of the plate;
a center hole extends through the plate, the center hole adapted to receive a shaft therethrough;
a plurality of emulsion holes disposed radially outward from the center holes, each of the plurality of emulsion holes configured to allow food to pass therethrough, wherein each of the emulsion holes are formed with a uniform diameter;
the edge is a uniform width throughout the circumference of the plate, wherein the edge comprises one or more first indentations that are configured to engage with one or more corresponding projections within a housing that encloses the plate;
the edge further comprises one or both of a first set of second indentations and a second set of second indentations, wherein each of the second indentations are smaller than the one or more first indentations,
wherein the first set of indentations are disposed on a first side of a first indentation of the one or more first indentations and the second set of indentations are disposed on an opposite second side of the first indentation of the one or more first indentations,
wherein a number of indentations within the first set of second indentations corresponds to a first digit of the uniform diameter, and a number of indentations of the second set of second indentations corresponds to a second digit of the uniform diameter;
a second plate with opposite first and second face surfaces and an edge that extends around a circumference of the second plate, a center hole to receive the shaft therethrough, and a plurality of emulsion holes, wherein the plate and the second plate are aligned such that the second face surface of the plate makes contact with the first face surface of the second plate, such that the plurality of emulsion holes of the plate are co-axial with the plurality of emulsion holes of the second plate, wherein the plate and the second plate are substantially the same diameter.

19. The emulsion plate system of claim 18, wherein the plurality of emulsion holes of the plate have a smaller diameter than the plurality of emulsion holes of the second plate.

20. The emulsion plate system of claim 18, wherein the second plate comprises a plurality of pegs that extend from the first face, and the plate comprises a plurality of apertures that are disposed to receive the plurality of pegs.

21. The emulsion plate system of claim 19, wherein each of the plurality of emulsion holes of the second plate have a varying diameter through at least a portion of their depth, with a larger first diameter at the first face than a second diameter at the second face.

22. The emulsion plate system of claim 21, wherein each of the plurality of emulsion holes of the second plate have a chamfered portion that extends from the first face.

23. The emulsion plate system of claim 19, wherein the diameter of the plurality of emulsion holes in the second plate are about 33% larger than the diameter of the plurality of holes of the first plate.

24. The emulsion plate system of claim 18, further comprising at least one spring disposed conjunction with the one or more emulsion plates and the one or more knives.

25. The emulsion plate system of claim 18, further comprising a retaining ring with a first portion that bears against the first face surface of the plate and a cylindrical portion that extends through the center holes of the plate and the second plate.

* * * * *